United States Patent

Ogata

[11] Patent Number: 5,844,603
[45] Date of Patent: Dec. 1, 1998

[54] IMAGE DATA PROCESSING APPARATUS HAVING FUNCTIONS OF DIVIDING THE IMAGE DATA, AND METHOD OF PROCESSING IMAGE DATA

[75] Inventor: Jun Ogata, Yokohama, Japan

[73] Assignee: Kabushiki Kaisha Toshiba, Kawasaki, Japan

[21] Appl. No.: 529,106

[22] Filed: Sep. 15, 1995

[30] Foreign Application Priority Data

Sep. 21, 1994 [JP] Japan .................................. 6-226351
Jul. 26, 1995 [JP] Japan .................................. 7-190460

[51] Int. Cl.⁶ .................................................. H04N 7/18
[52] U.S. Cl. .......................................... 348/155; 348/143
[58] Field of Search .............................. 348/47, 87, 94, 348/144, 154, 155, 399, 610, 143, 402, 420, 333–334; 382/151; H04N 7/18

[56] References Cited

U.S. PATENT DOCUMENTS

| | | | |
|---|---|---|---|
| 4,692,806 | 9/1987 | Anderson et al. | 348/399 |
| 4,796,087 | 1/1989 | Guichard et al. | 348/402 |
| 4,922,341 | 5/1990 | Strobach | 348/420 |
| 5,063,438 | 11/1991 | Faroudja | 348/610 |
| 5,339,104 | 8/1994 | Hong . | |
| 5,473,364 | 12/1995 | Burt | 348/47 |
| 5,504,520 | 4/1996 | Yamamoto | 348/154 |
| 5,548,326 | 8/1996 | Michael | 348/87 |
| 5,608,458 | 3/1997 | Chen et al. | 348/420 |

FOREIGN PATENT DOCUMENTS 0 604 009 A1  12/1992  European Pat. Off. .
0 528 105 A1  2/1993   European Pat. Off. .

OTHER PUBLICATIONS

Haber, "Uberwachung mit digitaler Bildubertragung", Signal, 1992, No. 9.

*Primary Examiner*—Richard Lee
*Attorney, Agent, or Firm*—Cushman Darby & Cushman IP Group of Pillsbury Madison & Sutro LLP

[57] ABSTRACT

The image data processing apparatus includes a camera for converting an image of an area to be processed into image data, a function of dividing the image data into divisional image data items corresponding to divisional areas obtained by dividing the divisional areas, and a function of performing predetermined processing for each of the divisional image data items, thereby to detect an abnormal state of the area to be processed.

23 Claims, 20 Drawing Sheets

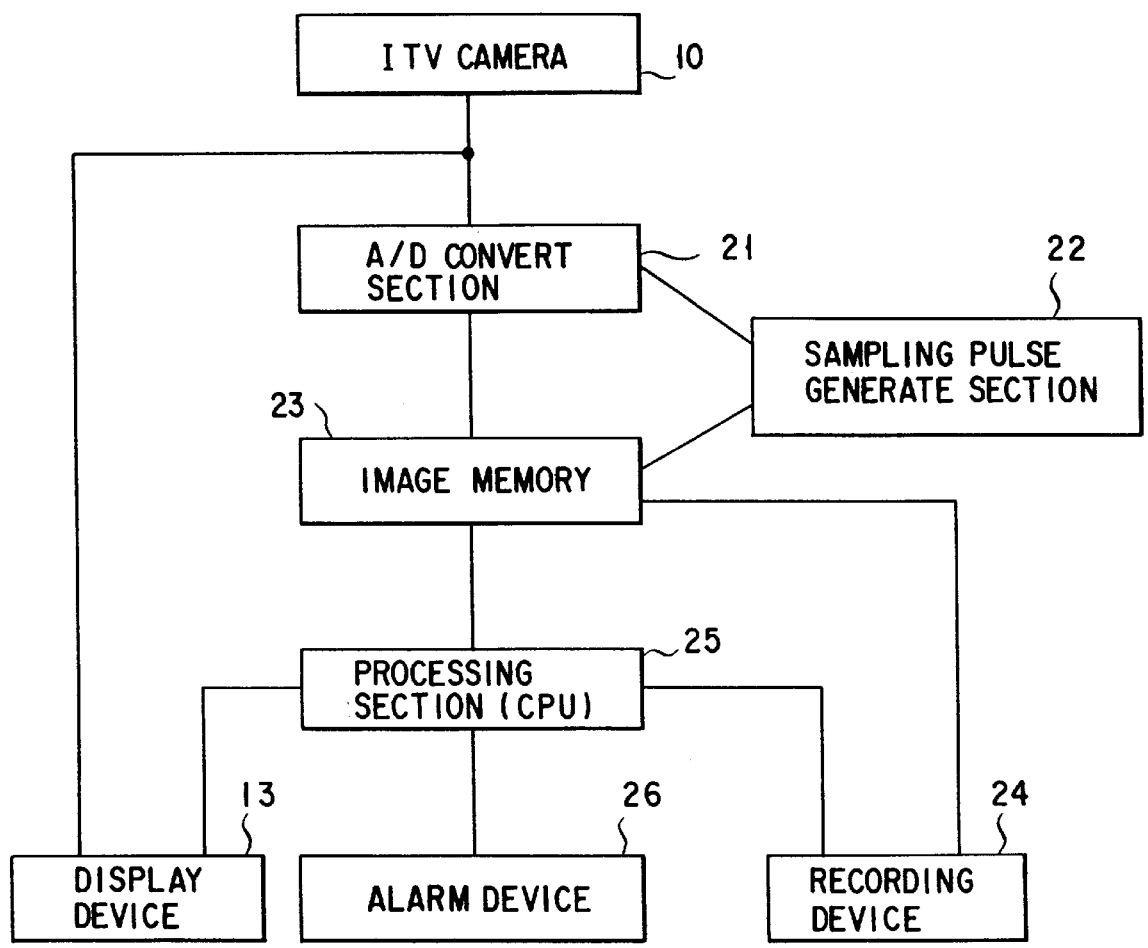
F I G. 1

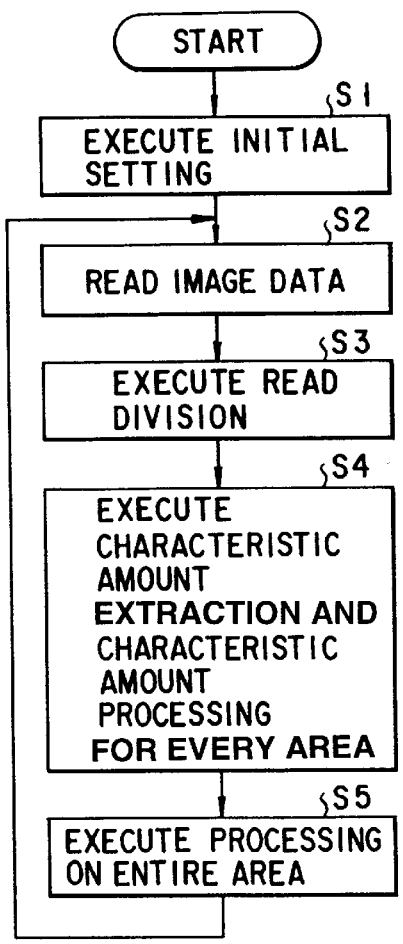
F I G. 7
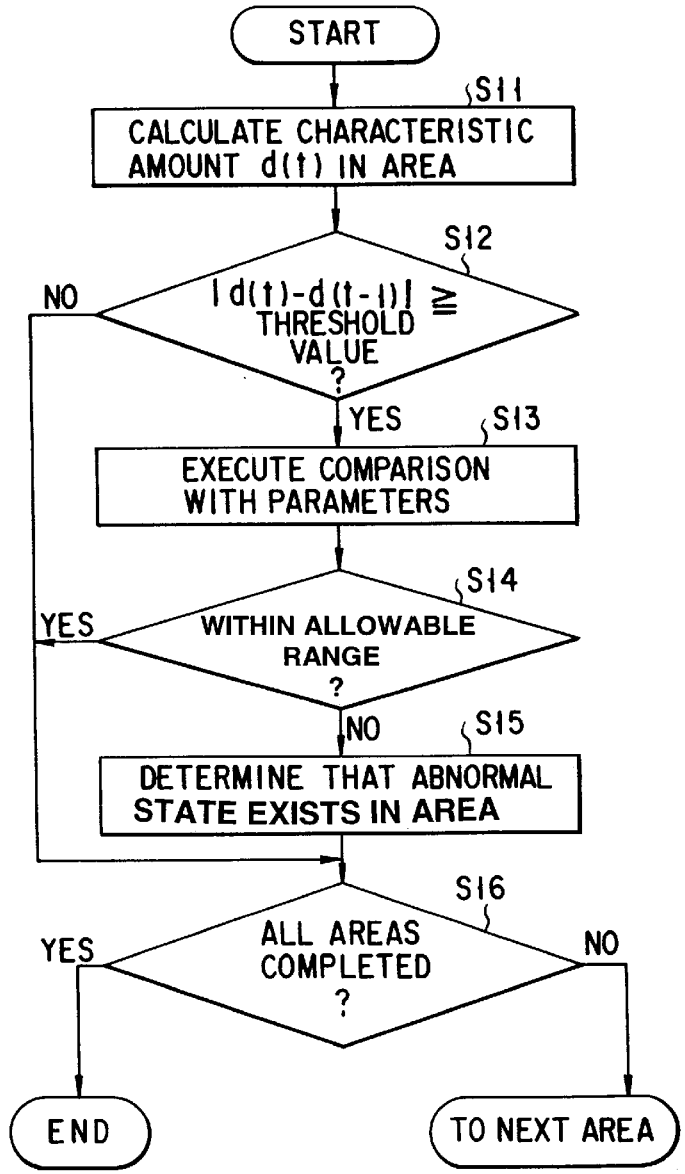
F I G. 8

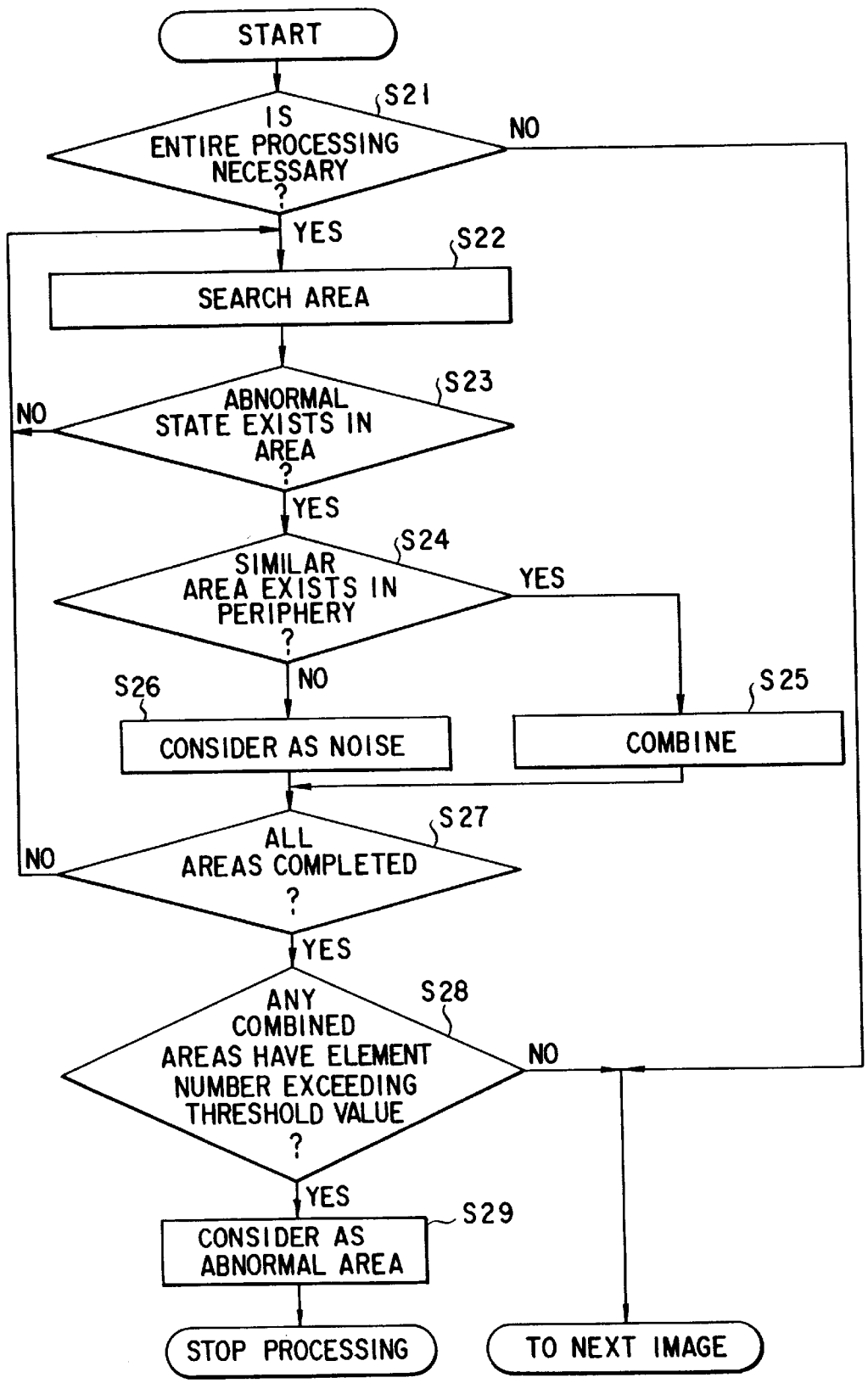
F I G. 9

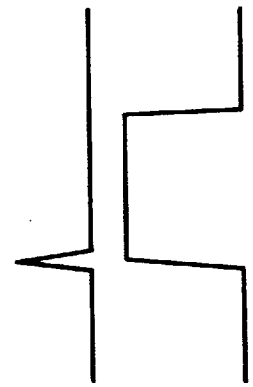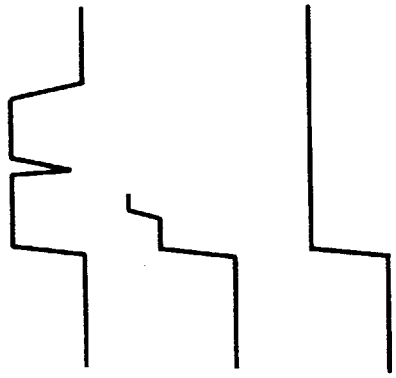

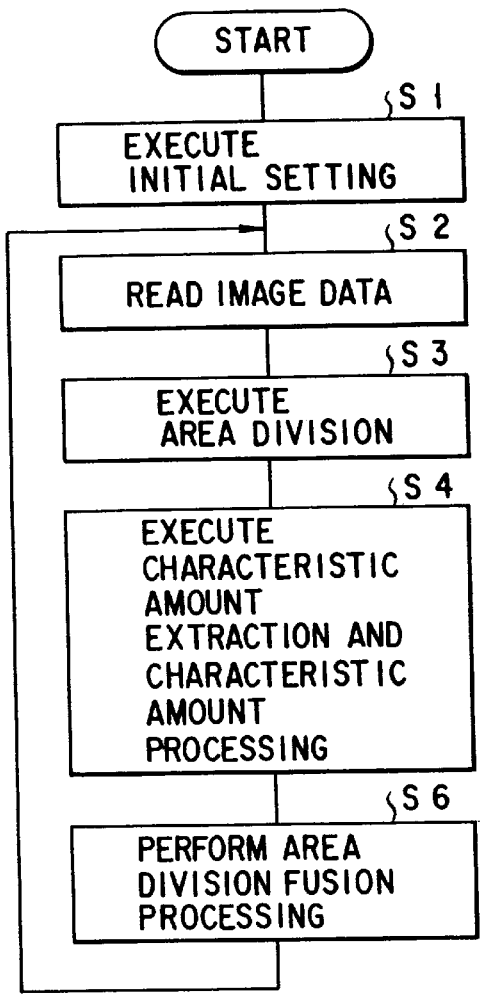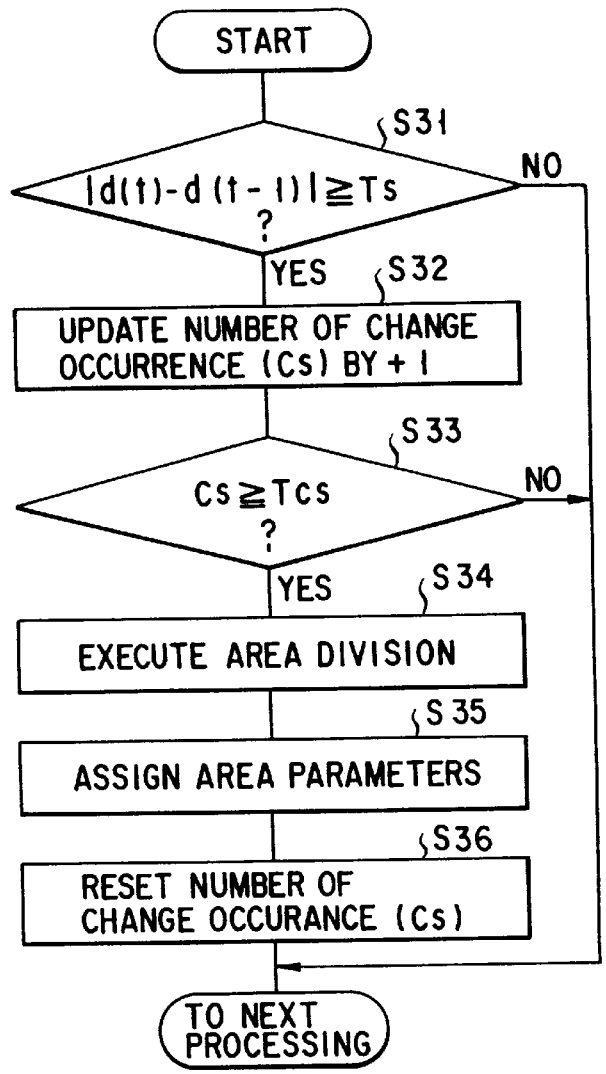
F I G. 12    F I G. 17

LED OFF

LED ON

HIDDEN WITH SHUTTER

SHUTTER OPENED

| MARKS ARE AT PROPER POSITION | MARKS ARE SHIFTED WITHIN ALLOWABLE RANGE | MARKS ARE OUT OF IMAGE PICK UP RANGE |

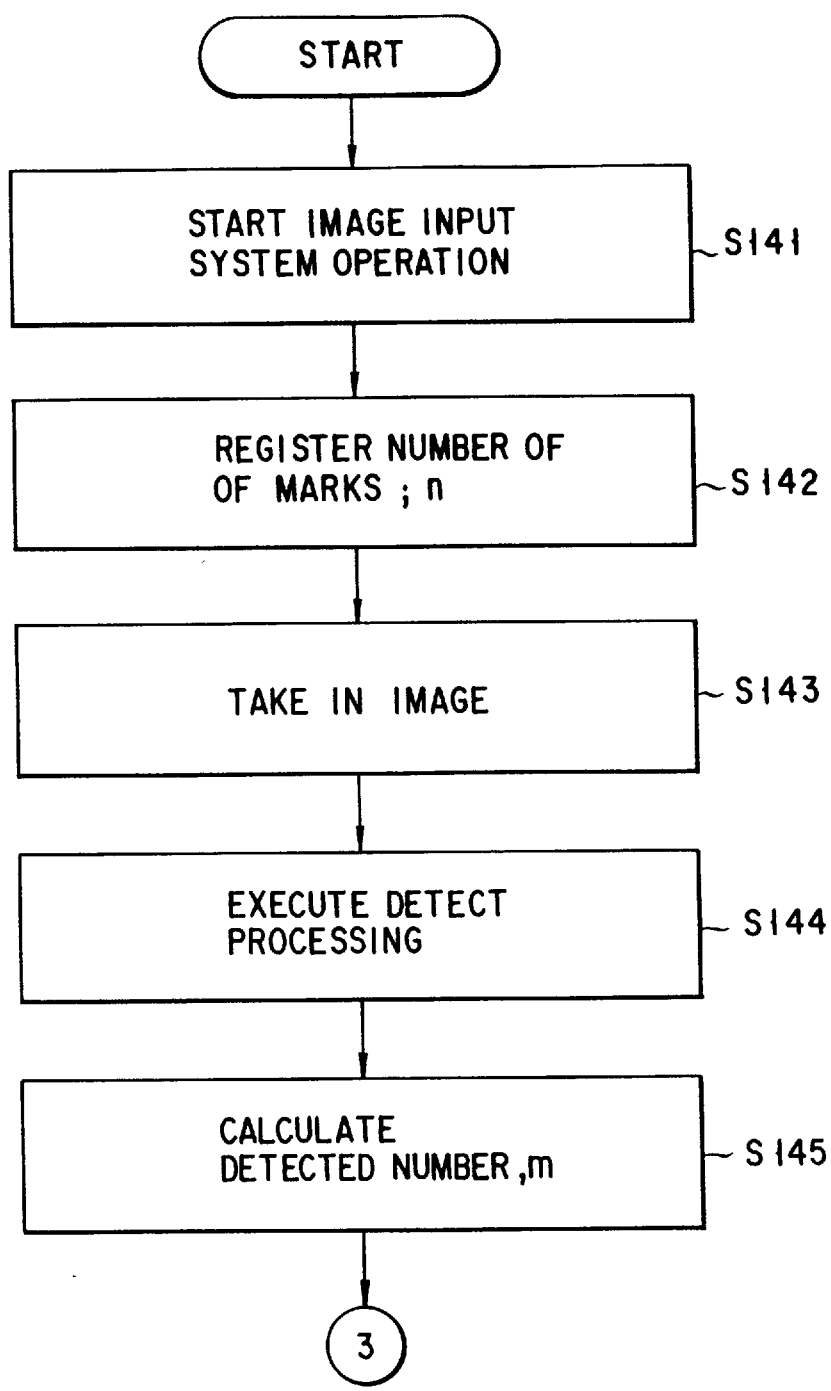
F I G. 30A

IMAGE DATA PROCESSING APPARATUS HAVING FUNCTIONS OF DIVIDING THE IMAGE DATA, AND METHOD OF PROCESSING IMAGE DATA

BACKGROUND OF THE INVENTION

1. Field of the Invention

The present invention relates to an abnormal state detect method and an abnormal state detect apparatus, for monitoring an image within a monitor area with use of an image pick-up means such as an ITV camera, to detect an abnormal state in an image, and an abnormal state detect apparatus.

2. Description of the Related Art

For example, in a case where an image pick-up means is used to monitor an image within a monitor area, consecutive images inputted on a time base or an image and a background image are compared. Then, the result is subjected to binary processing, to extract candidates of change areas which are considered to be caused by a movement of an object or the like.

In this case, areas where an object did not spatially exist were previously checked from placement conditions of an ITV camera, and data concerning the object, which was previously recognized and is sure to enter into the monitor area, was previously stored as a template. A change area, which is too small from among extracted change areas is considered to be noise and is removed, while other remaining candidate areas are subjected to comparison with a template. If any of the areas are similar to the template, it is determined that a change of the area has already been recognized. If there is no area similar to the template, the change of the area is a change which was not previously recognized, and therefore, determined as an abnormal state.

Further, in several cases, this apparatus is applied to a paper material dealing apparatus or the like which classifies stocks, mail, and the like by conveying them through convey paths. This card material dealing apparatus conveys postcards through convey paths, thereby classifying the paper materials, depending on their classifications. Paper materials are moved through substantially fixed lines previously predetermined. These paper materials sometimes derive or fall from the convey paths, due to accidents, due to abnormal states, e.g., bending or break-down of the paper materials or due to environmental changes. However, if an abnormal state detect apparatus is placed on a convey path, such abnormal states can be detected.

A conventional abnormal state detect method is, however, easily influenced by noise caused by vibrations of an ITV camera or the like, and influences from such noise appear when a differential binary image between images is obtained. Therefore, there is a problem such that a noise removing processing must be provided.

In addition, it is necessary to previously provide information concerning the position of an ITV camera. Further, when extraction is performed from candidate areas obtained as a result of differential binary processing, a comparison with a number of templates corresponding to objects which can appear in an image must be carried out. Therefore, there is a problem such that the number of calculations tends to be large.

Further, since many kinds of templates are required, with respect to objects which can appear, in order to make a determination based on a shape of a change area to determine whether a change is caused by a factor of an abnormal state or is included in a regular state, a problem exists such that it is not easy to distinguish a regular change from an abnormal change state.

In addition, when this apparatus is applied to a paper material dealing apparatus as described above, an operator must periodically carry out a complicated inspection to determine whether an ITV camera is placed in a monitor or area, and whether there is a defect in the abnormal state detect function.

SUMMARY OF THE INVENTION

An object of the present invention is to provide an image data processing method and an image data processing apparatus capable of detecting changes and abnormal states in an image at a high speed, without comparison with templates.

Another object of the present invention is to provide an image data processing method and an image data processing apparatus capable of automatically setting a position of a detection area and diagnosing a detect function, without an operator.

The present invention provides an image data processing apparatus comprising: means for continuously receiving an image of a first area to be processed, and for converting the image into a first image data item; means for dividing the first image data into a plurality of second image data items corresponding to a plurality of second areas which are smaller than the first area; and means for performing predetermined processing for each of the second image data items so as to determine an abnormal state in the first area.

The present invention further provides an image data processing method according to the first embodiment comprising: an inverting step of continuously receiving an image of a first area to be processed, and converting the image into a first image data item; a dividing step of dividing the first image data into a plurality of second image data items corresponding to a plurality of second areas which are smaller than the first area; and a detecting step of performing predetermined processing for each of the second image data items, thereby to determine an abnormal state in the first area.

Further, the present invention provides an image data processing apparatus comprising: means for continuously receiving an image of a first area to be processed, and for converting the image into a first image data item; means for dividing the first image data into a plurality of second image data items corresponding to a plurality of second areas each of which is smaller than the first area; means for generating a recognizable mark in the first area at a predetermined timing; and means for detecting the mark generated by the means for generating a mark, thereby to determine that an inverting function of the image data processing apparatus regularly operates.

As described above, according to the image processing apparatus and method of the present invention, an image to be processed is divided into a plurality of images, and predetermined processing is performed on these divisional images, thereby to determine whether an abnormal state (or a change) is included in the image. Said predetermined processing, for example, is processing to determine that an abnormal state occurs in an image if the average density of an image or a time-based change in the characteristic amount of a dispersion value is a predetermined value or more. Due to this processing, an abnormal state can be detected by merely detecting changes in the characteristic amounts, so that processing for comparing an image with image templates, as is used in a conventional apparatus, is no longer required. As a result, processing time can be greatly reduced. In addition, vibration of a camera is absorbed, and therefore, countermeasures for noise are no longer necessary.

In addition, according to the invention as described above, a recognizable mark is generated (e.g., by an LED) in the area of an image to be processed, and this mark is recognized and determined by an image pickup system. As a result of this, an operator need not carry out complicated preparation to determine whether an abnormal state exists in the functions of the image pick-up system, unlike in a conventional apparatus.

Further, according to the present invention, if programs are arranged such that self diagnostic processing for the image pick-up system is automatically carried out, a defect can be detected early unless an operator positively carries out diagnosis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram schematically showing the structure of an abnormal state detect apparatus according to an embodiment of the present invention.

FIG. 3A shows an input image and FIG. 3B shows a divided image.

FIG. 7 is a flow-chart which explains the entire processing.

FIG. 8 is a flow-chart which explains processing in an area level.

FIG. 9 is a flow-chart which explains the processing in the entire areas.

FIGS. 10A through 10G show examples of time-based changes of characteristic amounts.

FIG. 12 is a flow-chart which explains the entire processing of an abnormal state detect apparatus according to a second embodiment of the present invention.

FIG. 17 is a flow-chart which explains division processing of areas.

FIG. 30A is a flow-chart explaining an operation for setting a monitor area.

DETAILED DESCRIPTION OF THE PREFERRED EMBODIMENTS

In the following, embodiments of the present invention will be explained with reference to the Drawings.

A first embodiment of the present invention will be explained below.

Figure 2:
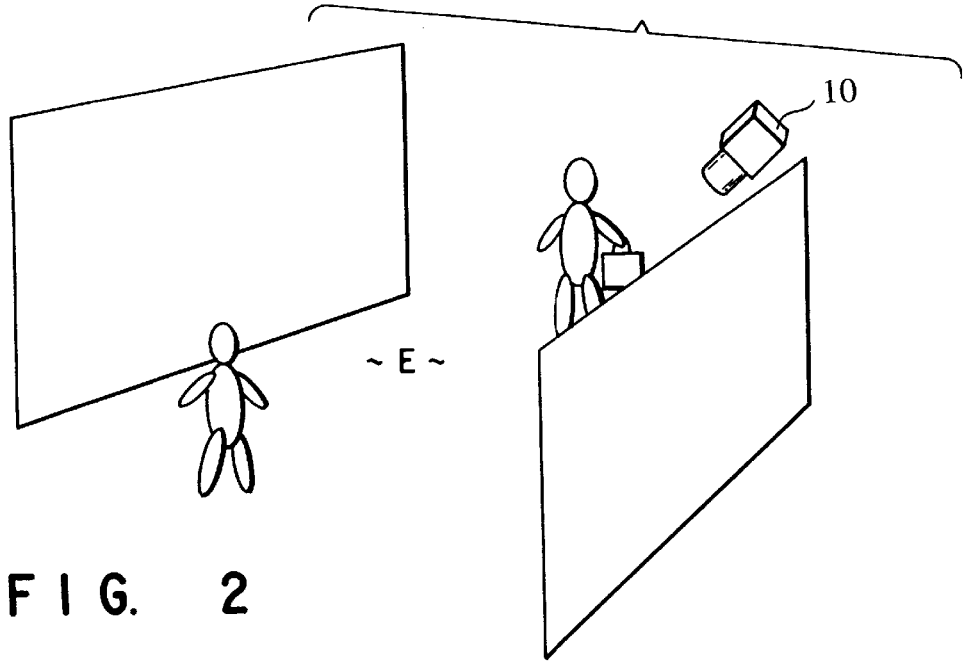
FIG. 2 is a view showing an example of a monitor environment and placement of an ITV camera.

FIG. 1 schematically shows the structure of an abnormal state detect apparatus according to the first embodiment. Specifically, an ITV camera 10 as an image pick-up means is placed, for example, as shown in FIG. 2, and images within a monitor area E as shown in the figure are continuously picked up, and converted into electric signals. Image signals (analog signals) outputted from the ITV camera 10 are inputted into an A/D converting section 21, and are digitized by sampling pulses of a predetermined sampling rate outputted from a sampling pulse generating section 22. The signals thus digitized are sequentially stored as image data into an image memory 23. These input images can be recognized by displaying them on a display device 13, and also, can be checked later if these input images are recorded and stored by a recording device 24 such as a video tape recorder or the like.

A processing section 25 is constituted mainly by a CPU, and performs processing, as will be described later, on a plurality of images (e.g., two images) taken on a time-base by an image memory 23, thereby to achieve processing for extracting an abnormal state from the images. If it is determined that an abnormal state occurs, the processing section 25 makes an alarm device 26 operate to notify an operator, or the like, of the abnormal state, while the processing section 25 makes the recording device 24 record images preceding and following the image determined as including an abnormal state, and causes those images to be displayed on the display device 13, so that an operator can confirm the abnormal state.

Figure 3A:
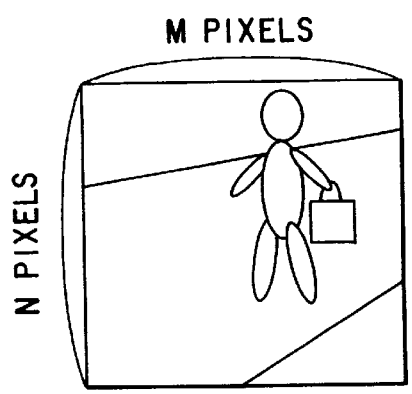
FIGS. 3A and 3B are views which explain processing for dividing an input image into a plurality of areas
Figure 3B:
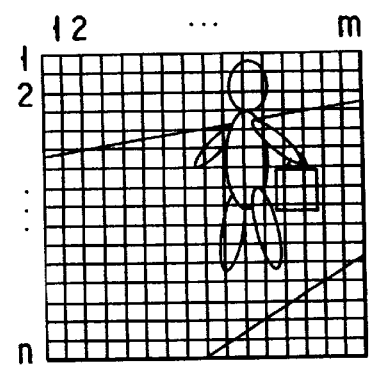
Figure 4:
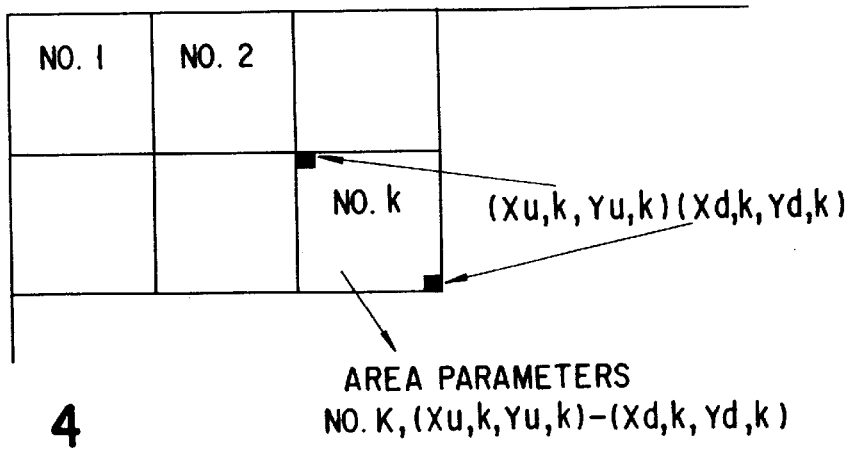
FIG. 4 is a view which explains how parameters of areas are provided.

The processing section 25 divides an input image (of M×N pixels) as shown in FIG. 3A taken in by the image memory 23 into a plurality of areas, such that each area is equal, defined by uniformly dividing an input image in the longitudinal and lateral directions (e.g., by m and n, respectively). The areas thus divided respectively have numbers with respect to the total number of the entire areas, and coordinate values of upper left and lower right corners, as parameters (see FIG. 4).

Figure 5A:
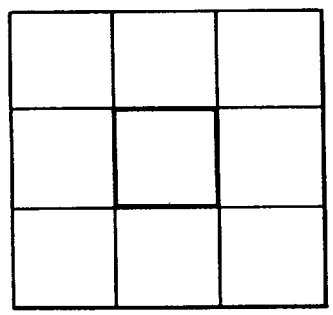
FIGS. 5A and 5B are views showing an area dividing method.
Figure 5B:
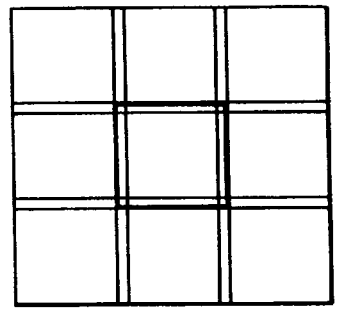

With respect to division of areas, there is a method in which areas do not overlap each other as shown in FIG. 5A and another method, as shown in FIG. 5B, in which areas partially overlap each other. Although each of the divided areas has been explained as having a size equal to other divided areas, the size of such an area, which should be monitored particularly closely, may further be divided into a number of small areas, and thus, it is possible to change the size of the divided areas if necessary. In this case, areas must be assigned to the entire image.

To actually process an image, an input image at each time is divided into a plurality of areas as has been explained above, and each of the areas is subjected to processing as will be explained below. Although division of areas has been explained to be performed such that each of the divided areas has a rectangular shape, the shape of an area is not limited to a rectangle.

In the following, detailed explanation will be made of time-based changes of a characteristic amount in each of the divided areas and processing for extracting an abnormal state.

Figure 6A:
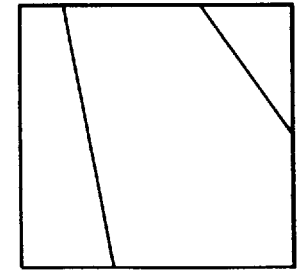
FIGS. 6A through 6G are views showing changes in characteristic amounts of an input image and areas.
Figure 6B:
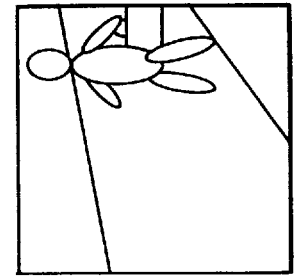
Figure 6C:
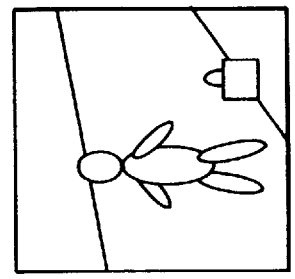
Figure 6D:
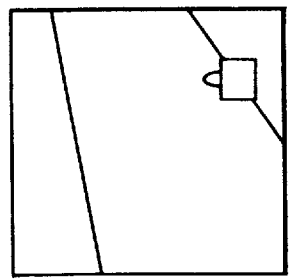
Figure 6E:
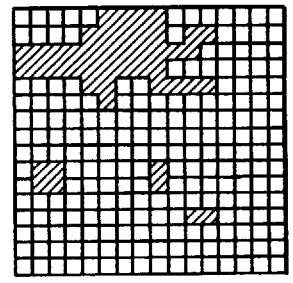
Figure 6F:
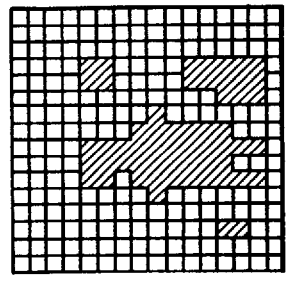
Figure 6G:
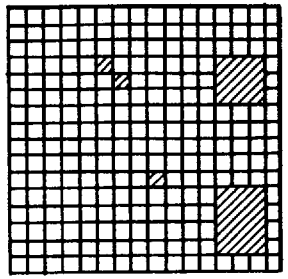

FIGS. 6A through 6G show an example in which an input image is divided into a plurality of areas, and thereafter, an abnormal state is extracted on the basis of time-based changes in the characteristic amount in the divided areas. This figure shows an area which includes a change in accordance with changes in characteristic amounts within the divided areas. The flow of this processing will be explained with reference to a flow-chart of the entire processing shown in FIG. 7. FIGS. 6A to 6D show input images, while (f) FIGS. 6E to 6F to (g) show changes in characteristic amounts of areas corresponding to the input images.

At first, with respect to each of divided areas, time-based changes in characteristic amount are set as a parameter in initial setting (S1). Next, an input image converted into digital image data at each time point is taken in (S2), and the input image thus taken in is divided into a plurality of areas (S3). With respect to each area, any characteristic amount included in each image is calculated (S4). In each of the areas, changes in characteristic amount up to the time point are compared with a parameter supplied to the area, presence or absence of an abnormal state is checked for every area (S4). Next, results of processing respective areas are integrated, and the presence or absence of an abnormal state is checked with respect to the entire areas. If it is determined that an abnormal state occurs, notification is performed (S5).

An average density value of an image, a dispersion value, and a confusion (complication) using a result of differential binarization may be used as the characteristic amount included in each divided area. In the case of a color image, each color phase, a chrome, and a brightness may be used.

If an average density value or a dispersion value is used as the characteristic amount, an average value within an area is once obtained and a dispersion value is calculated again, according to a normal dispersion value calculation method. However, if a taking-in interval between images is short and the processing speed is high, a change in an image pick-up view field between consecutive image is not relatively large, so that it is possible to obtain a dispersion value with use of an average value at a preceding time point, i.e., to use a so-called false dispersion value.

Next, the processing of extracting an abnormal state at respective area levels in the step S4 in the flow-chart of FIG. 7 will be specifically explained with reference to the flow-chart shown in FIG. 8.

A characteristic amount $d(t)$ is extracted sequentially for every divided area (S11), and a difference $d(t-1)$ from the extracted characteristic amount at a preceding time point is obtained. If it is determined that a change exists by threshold value processing (S12), the characteristic amount is compared with a parameter (S13). If the characteristic amount exceeds a predetermined threshold value as a result of comparison with an allowable range of the parameters (S14), it is determined that the change in characteristic amount is caused by an abnormal state, i.e., an abnormal state exists in the corresponding area (S15). This processing is performed on all of the areas.

Note that the threshold value used for extracting a change as described above and a threshold value of an allowable range of a parameter may be experimentally set with use of a result obtained by previously checking changes in the characteristic amount with use of a test image, or may appropriately be obtained such that changes in the characteristic amount can be extracted in the procedures of processing steps.

Examples of such threshold values will be explained below.

Figure 11A:
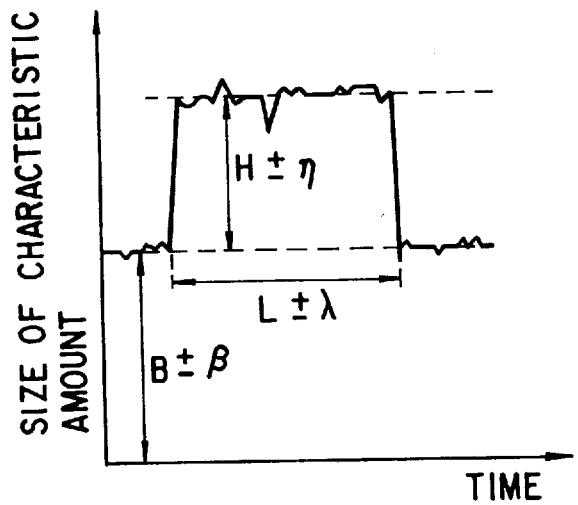
FIG. 11A and 11B explain an example of the manner in which characteristic parameters are decided.
Figure 11B:
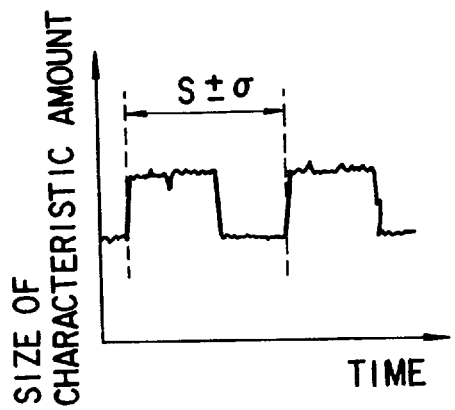

FIG. 10A is taken as an example of a time-based change in characteristic amount within each area. In this case, six parameters are considered as shown in FIG. 11A, e.g., a value (B) where the amount is stable, a height (H) when a change occurs, a continuation period (L) for which a change is maintained, and errors $\beta$, $\eta$, $\lambda$.

These parameters may be determined by investigating a result obtained by analyzing image data within a monitor area E, or may be determined from a result obtained by arranging a processing system so as to have a learning function and making the processing system perform learning such that a time-based change in characteristic amount can be appropriately extracted as described above.

Six examples shown in FIGS. 10B to 10G are examples of time-based changes in characteristic amount in this area.

In FIG. 10B, the change is remarkable at a starting period, and the amount soon returns to an original stable state. Therefore, this change is simply considered as noise.

In FIG. 10C, the entire shape and the continuation period are substantially equal to those of the above case, but the height of the peak exceeds the allowable range. Therefore, this change is considered as an abnormal state.

In FIG. 10D, the change is remarkable at a starting period, and the amount returns to an original state after a time period substantially equal to a continuation period. In this state, the change is similar to a parameter previously prepared, and is therefore considered as a regular change.

In FIG. 10E, the change is remarkable at a starting period, and the amount once decreases before the continuation period ends. Then, the amount returns to the height of the peak, and finally, returns to an original state after a time period substantially equal to the continuation period. This is a change similar to a parameter previously included, and is therefore considered as a regular change.

In FIG. 10F, the change is remarkable at a starting period, and the continuation period starts. However, the amount changes over the height of the peak. The change thus differs from a parameter previously included, and is therefore determined that an abnormal state exists.

In FIG. 10G, the change is remarkable at a starting period, and the continuation period starts. However, the amount does not return to an original state after the continuation period. Therefore, there is a possibility that something is staying in the corresponding area, so that it is determined that an abnormal state exists.

As explained above, if a change which is determined to be abnormal exists in changes in an area, it is determined that an abnormal state is present in the corresponding area.

Note that the six parameters as described above may be supplied for all of the areas, supposing that any change occurs in all of the areas. However, parameters other than B need not be supplied for those areas which have previously been recognized as including no changes, since parameters other than B are not necessary for such areas. Further, when an object which moves cyclically (e.g. an object conveyed on a belt conveyer of a conveyer system) is monitored, another parameter S(+σ) may be supplied as an occurrence interval between changes.

In the above explanation, a rectangular wave which changes in the positive direction is used as an example of a time-based change in characteristic amount. Needless to say, corresponding processing is performed in other cases.

Next, the processing, in step 5 of the flow-chart in FIG. 7, for extracting an abnormal state from the entire area will be specifically explained with reference to the flow-chart shown in FIG. 9.

After the processing for each area is completed, a determination is made as to whether the processing for the entire areas is necessary (S21). If the processing for the entire areas is necessary, results of areas in a periphery of an area indicating an abnormal state among the entire areas are investigated (S22). If there is another area including an abnormal state (S23) in the periphery of the area indicating an abnormal state, whether there is further another area indicating an abnormal state in the periphery of said another area is checked (S24) in the same way. If there is an area indicating an abnormal state, these areas are combined with each other (S25). In this state, if areas indicating an abnormal state exist isolated from each other, the size of a changing area is too small and the abnormal state is considered to be noise (S26).

If the number of elements, when areas indicating an abnormal state are finally combined with each other, exceeds a predetermined threshold value (S28) after presence of an abnormal state is thus checked with respect to the entire areas (S27), the group of those areas is determined as an abnormal area (S29), and it is determined that an abnormal state exists in the image. A notification is then performed by stopping processing. Even if the predetermined threshold value is not exceeded, any measure is taken for attracting attention.

The following methods are considered as methods of determining whether the processing should be performed with respect to the entire areas in the step S21. Specifically, as described above, occurrence of an abnormal state is checked for each area, and thereafter, searching for an abnormal state is performed on the entire areas where one of the following conditions is satisfied.

(1) As a result of performing processing of each area, one or more areas indicate an abnormal state.

(2) The ratio of the number of areas determined as including an abnormal state to the number of the entire areas exceeds a predetermined value.

Note that, if the processing speed is high, each change in the image pick-up view field is not large. It is therefore possible to obtain a dispersion value by using an average value of a preceding time point, i.e., a so-called false dispersion value, without using a normal calculation method of obtaining an average value within an area and then calculating a dispersion value again, when a dispersion value is calculated.

Next, a second embodiment will be explained.

The second embodiment is different from the first embodiment in that the processing (S5) for the entire areas, which is performed in the first embodiment, is not carried out, and instead, area division and fusion processing (S6) are performed, as shown in the flow-chart of the entire processing in FIG. 12. The area division and fusion processing will be specifically explained bellow.

Figure 13:
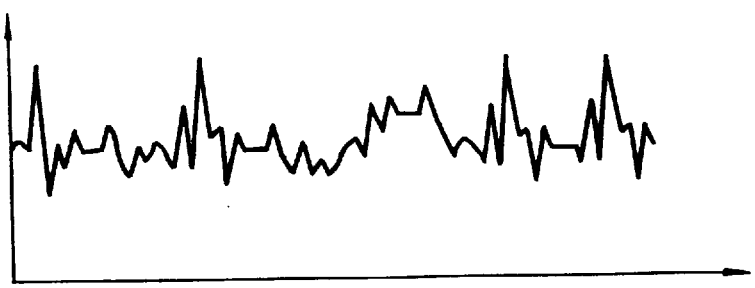
FIG. 13 shows an example of a time-based change of a characteristic amount such as noise.

First, processing of area division will be explained. As shown in FIG. 13, a time-based change in characteristic amount within a divided area shows a noise-like state. It is determined that noise always exists in the corresponding area. To prevent such a determination, each of the divided areas is further divided into small areas, so that time-base changes in characteristic amount can be monitored.

Specifically, with respect to areas in an image, if a time-based change in characteristic amount within an area is similar to noise as shown in FIG. 13, if the frequency of occurrences of changes is high, and if this state continues for a predetermined time period or more, the area is further divided.

With respect to this processing of area division, explanation will be made with reference to the flow-chart shown in FIG. 17. After extraction of characteristic amount d(t) is completed with respect to each of areas divided in the step S4, a difference between the amount and a characteristic amount d(t−1) at a preceding time point is obtained, and it is determined that a change occurs if the difference data is larger then a threshold value Ts (S31). The number of times for which the change occurs is calculated. If this change continuously exists and the number of times for which the change occurs exceeds a predetermined threshold value Tcs (S33), area division is performed (S34).

As a result of this, since parameters are not previously set with respect to those areas which are newly added by the area division, parameters of the areas before this area division are assigned to those areas (S35). Next, the number of times (Cs) for which a change occurs is reset (S36), and the flow goes to the next processing.

Figure 14:
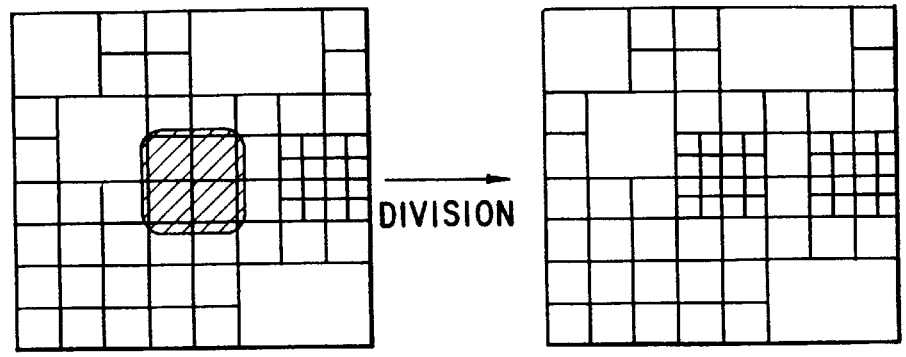
FIG. 14 explains an example of area division.

In the area division in the step S34, for example, division as shown in FIG. 14 is performed. In this step, a division is performed such that an area is divided into four equal small areas. A number of a new area and coordinate values of the upper left and lower right corners are assigned, for example, as parameters to each of the divided areas. In addition, depending on the division method of the initial state, areas may be divided so they may or may not have an overlapped portion (see FIG. 5).

Figure 15:
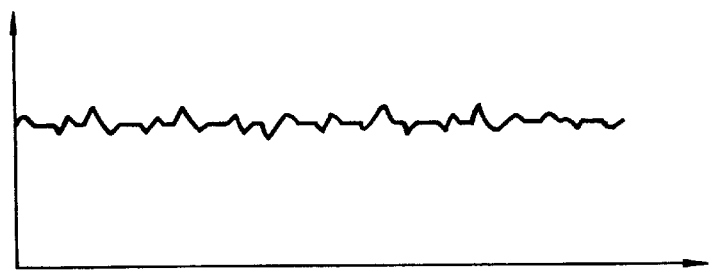
FIG. 15 shows an example of a time-based change of a characteristic amount which does not include substantial changes.

Next, fusion processing of areas will be explained. When time-based changes in characteristic amount in an area are not substantially observed with respect to areas in an image, as shown in FIG. 15, such changes occur at a low occurrence frequency. When this state continues for a predetermined period or longer, fusion with an area in the periphery which is in a similar state is performed.

Figure 18:
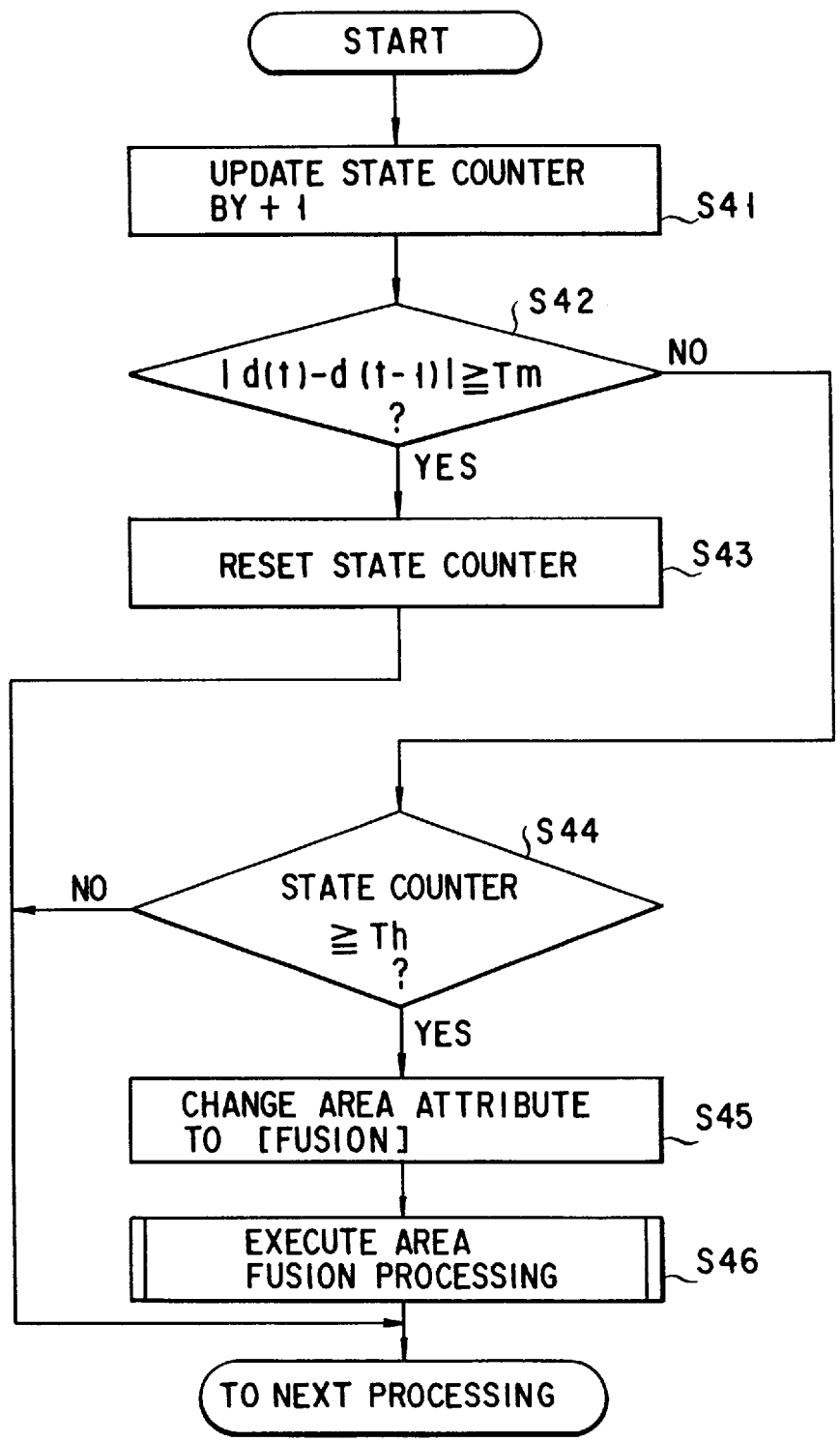
FIG. 18 is a flow-chart which explains fusion processing of areas.

This processing of area fusion will be explained with reference to the flow-chart shown in FIG. 18. After completion of division processing of the above described areas, a state counter for counting an absence of changes counts "+1" (S41). Then, a difference between the characteristic amounts d(t) and d(t−1) extracted as described above is obtained. If the difference data is larger than a threshold value Tm (S42), it is determined that a change occurs, and the state counter is reset (S43). The flow goes to processing of a next image.

When a state in which no changes exist continues and the count value of the state counter exceeds a predetermined threshold value Th (S44), attribute information added to an area is rendered "fusion"—possible (S45). All of the areas are checked, and thereafter, fusion processing is performed (S46).

Figure 19:
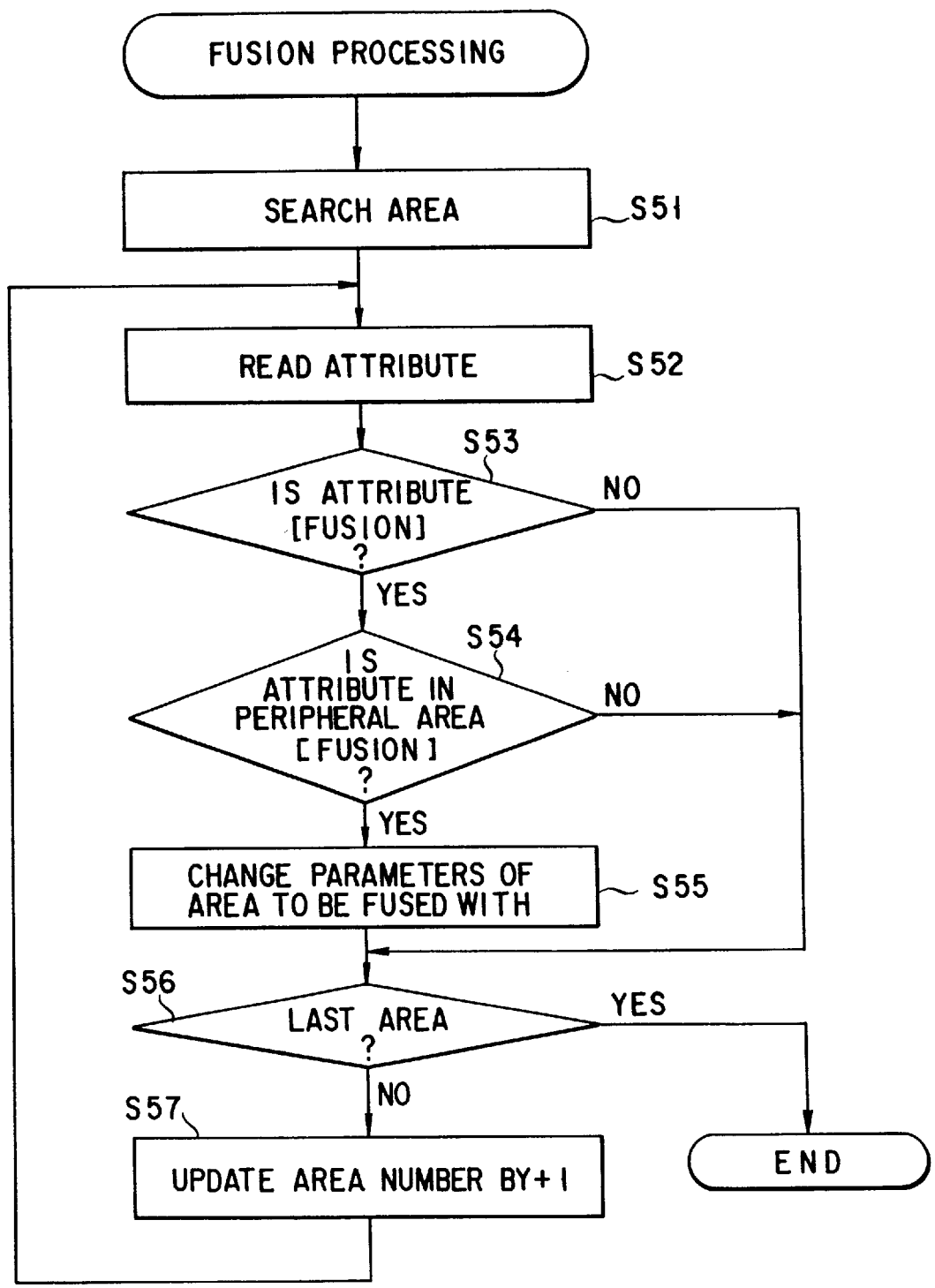
FIG. 19 is a flow-chart which explains fusion processing of areas.

Area fusion processing in step S46 will be explained with reference to a flow-chart shown in FIG. 19. At first, all the areas are subjected to searching (S51), attribute information of areas is read (S52), and whether or not fusion is possible is checked (S53). If fusion is possible, attribute information of close areas is checked to determine whether fusion is possible (S53). If fusion is possible, parameters of an area being processed are provided for an area to be fused (S55). With respect to areas on which fusion has already been performed, attribute information is returned to a normal state, and this operation is performed on all the areas (S56 and S57).

Figure 16:
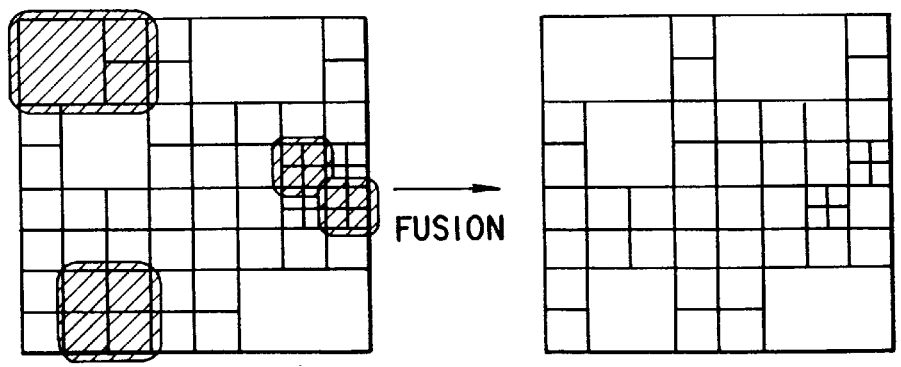
FIG. 16 shows an example of area fusion.

Fusion of areas is performed as shown in FIG. 16, for example. In this case, fusion of areas is carried out such that a new area becomes rectangular again. Specifically, three close areas, i.e., an area adjacent to the target area in the right side thereof, an area below the target area, and an area below the adjacent area on the right side of the target area are checked.

In the above, area division and fusion processing have been explained. However, if changes occur at a low frequency within an area, with respect to each of the areas in an image, it is possible to reduce the entire processing amount by reducing the number of times processing is performed on related areas, without performing fusion processing as described above.

In addition, if the number of areas changes by repeated division and fusion of areas, replacement of numbers of areas is performed if necessary. Replacement of the numbers of areas is performed, for example, in a method of checking the coordinate value of the left upper corner which each area has as a parameter in the order from the left upper area to the right lower area in an image, thereby assigning numbers thereto.

Although the above explanation has been made to a case in which fusion processing is performed subsequently after division processing of areas, the processing may be performed in a reverse order, or the division processing of areas and the fusion processing areas may be performed in parallel.

In the following, a third embodiment will be explained with reference to the drawings. The third embodiment is an example in which an abnormal state detect apparatus according to the present invention is applied to a paper material dealing apparatus in which a self-diagnosis function is supplied by a mark.

Figure 20:
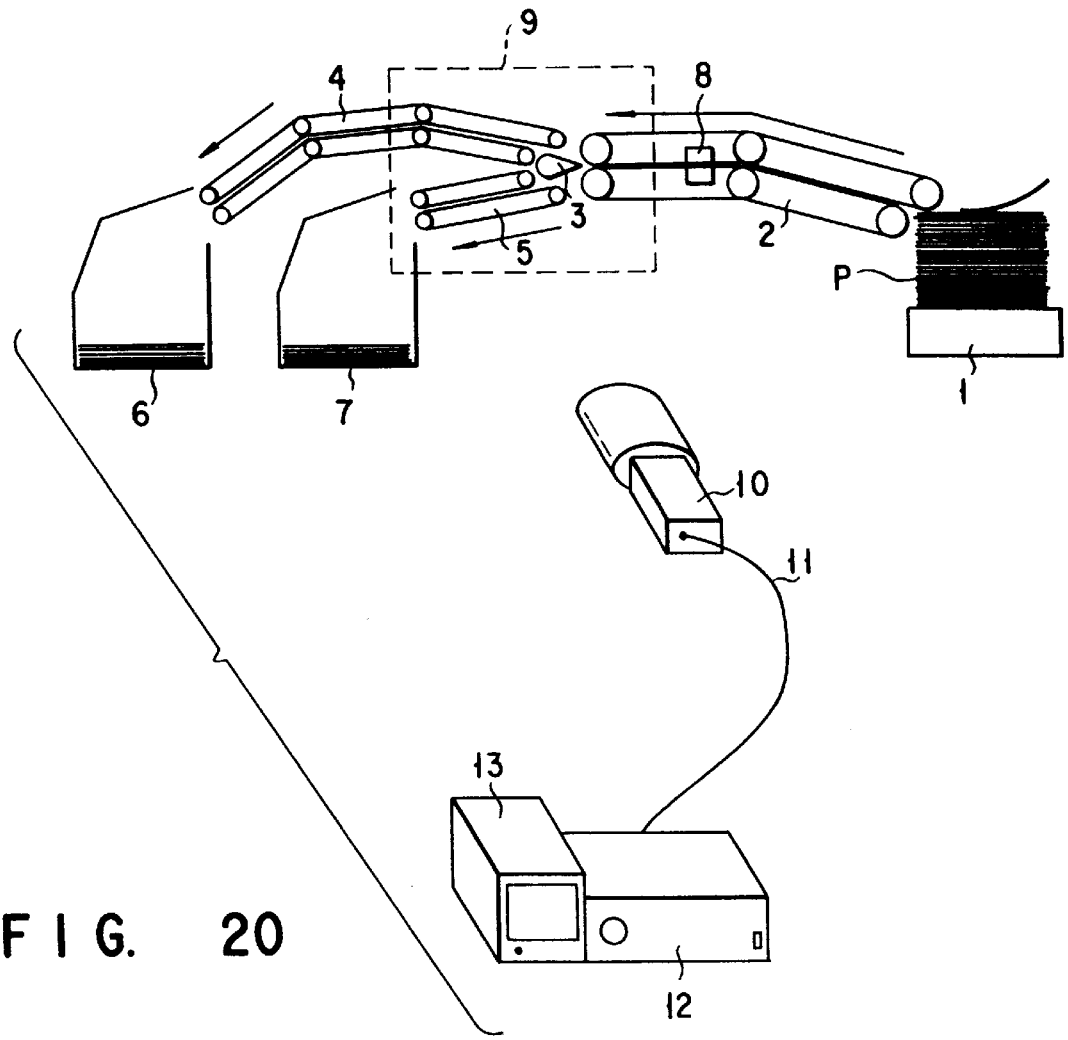
FIG. 20 schematically shows a structure of a paper material dealing apparatus according to a third embodiment of the present invention.
Figure 22A:
FIGS. 22A to 22B explain a specific example of a mark generating section.
Figure 22B:
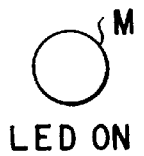

FIG. 20 schematically shows the structure of a paper material dealing apparatus according to the present invention. Specifically, a supply section 1 supplies paper materials P such as stocks, mail, or the like, one after another. Paper materials P thus supplied are conveyed by a convey path 2, and distributed into branch convey paths 4 and 5 through a distribution gate 3 provided at a rear end portion of the convey path 2. Compilation sections 6 and 7 are respectively provided at rear end portions of the branch convey paths 4 and 5, so that conveyed paper materials P are compiled and stored.

Note that a determination section 8 for determining the kinds of paper materials P by optically reading image information on the paper materials P is provided in the middle of the convey path 2, and the distribution gate 3 is switched and controlled in accordance with determination results of the determination section 8.

Meanwhile, an ITV camera 10 is provided at each of specific positions of the convey paths 2, 4, and 5 (i.e., within ranges in which an abnormal state is estimated to occur). For example, a predetermined range of a position of a distribution gate 3 is set as a monitor area 9, and an ITV camera 10 as an image pick-up means for picking up an image within the monitor area 9 is provided.

An image signal picked up by the ITV camera 10 is sent to a processing device 12 through a transmission path 11, and processing for detecting an abnormal conveyance of a paper material P is performed. When an abnormal conveyance is detected, an alarm device, not shown, is operated, or a figure or a letter indicating an abnormal state is displayed on a display device 13.

Figure 21:
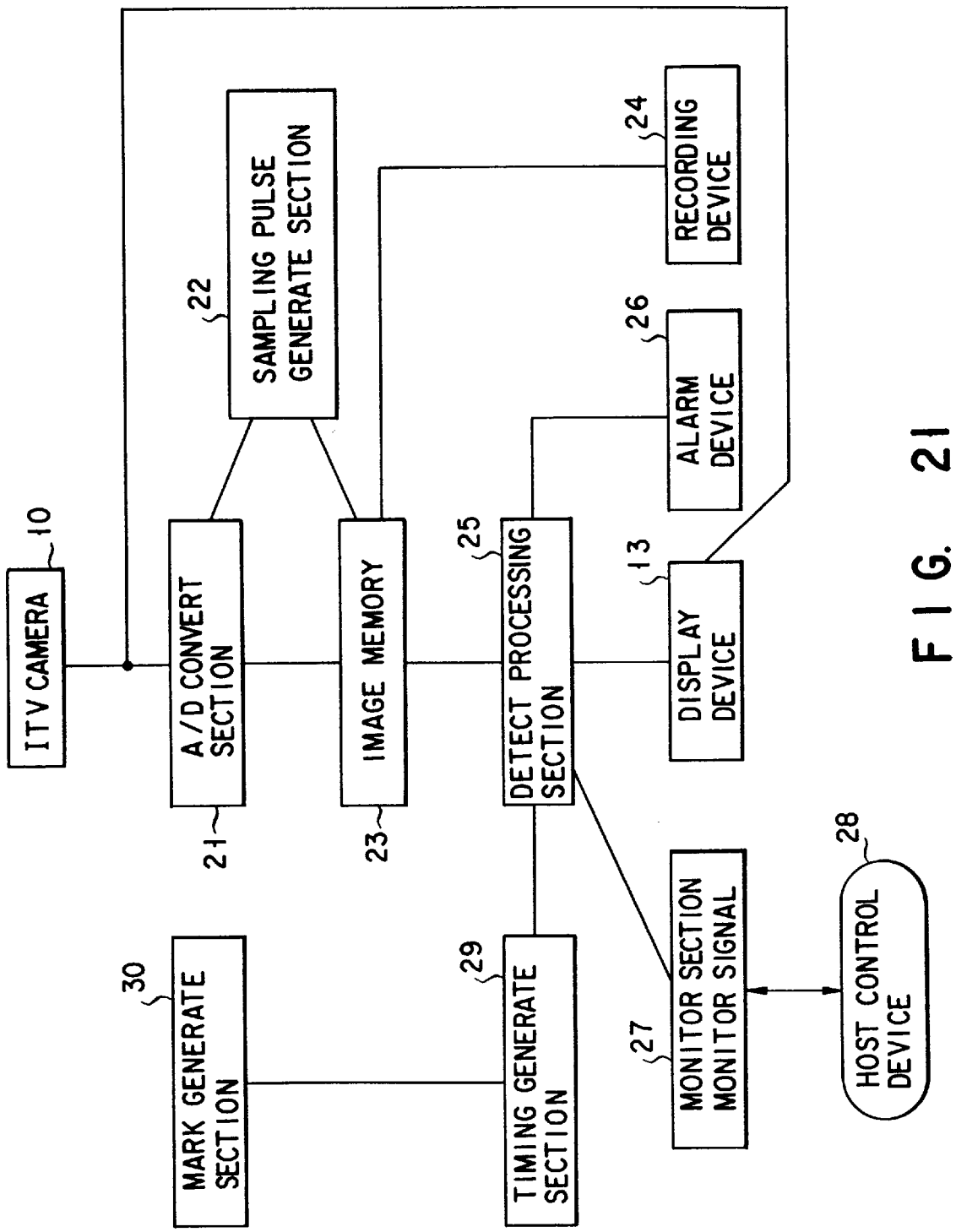
FIG. 21 is a block diagram of an example of a structure mainly showing a processing device according to the third embodiment.

FIG. 21 is a block diagram of an example of a structure according to the third embodiment, and mainly shows the processing device 12. This embodiment shows a case in which a self-diagnosis function is provided for an image pick-up system. The basic structure of this embodiment is the same as that of FIG. 1, and therefore, only those portions of the structure which are different from the structure of FIG. 1 will be explained below.

A detect processing section 25 mainly comprises, for example, a CPU and the like. This processing section 25 performs differentiate calculations on a plurality of images (e.g., two images) taken in by an image memory 23 on the time base, and extracts a change area between consecutive images on the time-base which are stored in the image memory 23, thereby to detect an abnormal conveyance of paper materials P. Further, this section 25 sends the results of detection to a display device 13 to display the results, and drives an alarm device 26, if necessary.

Otherwise, this detect processing may use image division processing according to the above first and second embodiments.

Further, the section 25 is arranged so as to send such information as monitor section monitor signals 27 to a host control device 28, thereby to control the entire apparatus.

The detect processing section 25 is connected through a timing generate section 29 with a mark generate section 30 as a specific mark generating means. The mark generate section 30 generates a mark in a monitor area 9 when self-diagnosis for an image pick-up system is performed.

Figure 23A:
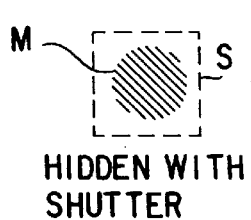
FIGS. 23A to 23B explain another specific example of a mark generating section.
Figure 23B:
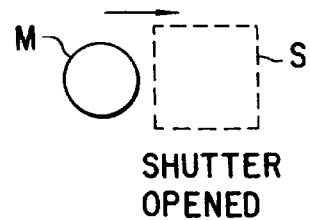

As a specific method of generating a mark in the mark generate section 30, for example, there is a method of using a mark M which can be electrically turned on/off like an LED (light emitting diode) or a method of making a mark M appear by mechanically opening/closing a shutter, as shown in FIGS. 23A and 23B. In this case, a change realized upon a mark generating instruction may be either ON/OFF (or "invisible" to "visible") or OFF/ON (or "visible" to "invisible").

As a method of generating a mark other than those described above, such a method which enables a change to locally occur can be used.

In addition, in cases where a shutter is used as a mark, the shape which appears when the shutter returns back is explained as a circle in this example, but this shape is not limited to a circle in any of the cases.

Figure 24:
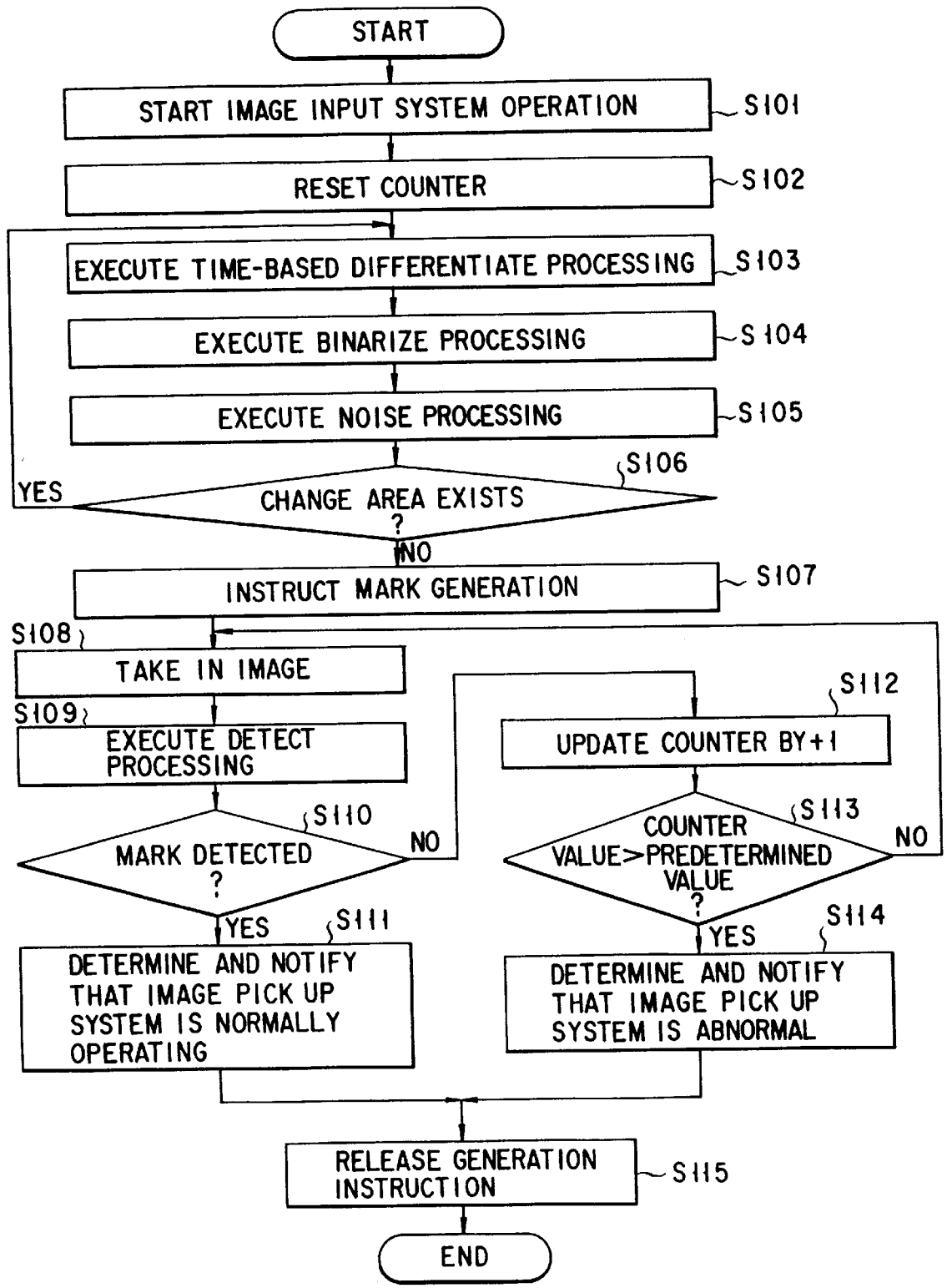
FIG. 24 is a flow-chart which explains self-diagnosis processing of an image pick-up system.

Next, the processing for performing self-diagnosis as to whether or not an image pick-up system is regularly operating will be explained with reference to flow-charts shown in FIG. 24. Image input operation from an ITV camera 10 is started (S101), and a self-diagnosis time measurement counter is reset (S102). The detect processing section 25 performs time-based differentiate processing on consecutive images on the time-base, which are taken in by the image memory 23. A difference between two consecutive images in the image memory 23 is obtained (S103), and noise processing (S105) is performed on a result obtained by performing binarize processing (S104) on the result obtained above as the difference. Finally, whether or not concentrated change areas exist in an image is checked (S106). If such change areas exist, there is a possibility that the apparatus is moving within monitor area 9, and therefore, the flow returns to the differentiate processing in step S103. The operation as described above is repeated.

With respect to noise reduction, it is possible to achieve noise reduction, for example, by eliminating isolated points from a binary image by means of compression and expansion processing.

If an abnormal state is not detected in the step S106, the detect processing section 25 makes a mark as described above generated in the monitor area 9 by sending a mark generate instruction to a mark generate section 30 through a timing generate section 29.

Then, the detect processing section 25 takes in an image in the monitor area 9 again (S108), and performs detect processing by a method of time-based difference using a plurality of images taken in by the image memory 23, like detection of an abnormal conveyance state, as described above, or by a method of image division detect processing as specifically explained above (S109), thereby to check whether or not a change due to a mark is detected (S110) after generation of a mark is instructed. If a mark is detected, the image pick-up system is determined as operating normally, and the state that the system is operating normally is displayed on the display device 13 (S111). Then, the mark generate instruction is released (S115).

If a mark is not detected in the step S110, the contents of the self diagnosis time measurement counter is updated by "+1" (S112), and thereafter, whether the value of the counter is larger than a previously set predetermined value is determined (S113). If the value is smaller than the predetermined value, the flow returns to the image take-in processing in the step S108, and the same operation as described above is repeated.

In the step S113, if the value of the counter is larger than the predetermined value, it is determined that there is a defect in an input from the image pick-up system (S114), and the display device 13 indicates that a defect exists in an output. Then, the flow goes to the step S115 and releases the mark generate instruction.

Specifically, if generation of a mark cannot be detected when a predetermined time has passed since an instruction of generating a mark was supplied, it is determined that there is a defect in an input from the image pick-up system and a notification is supplied. If a mark is detected within the predetermined time, it is determined that the image pick-up system is operating normally and a notification is supplied. The successive processing is then continued.

Figure 25:
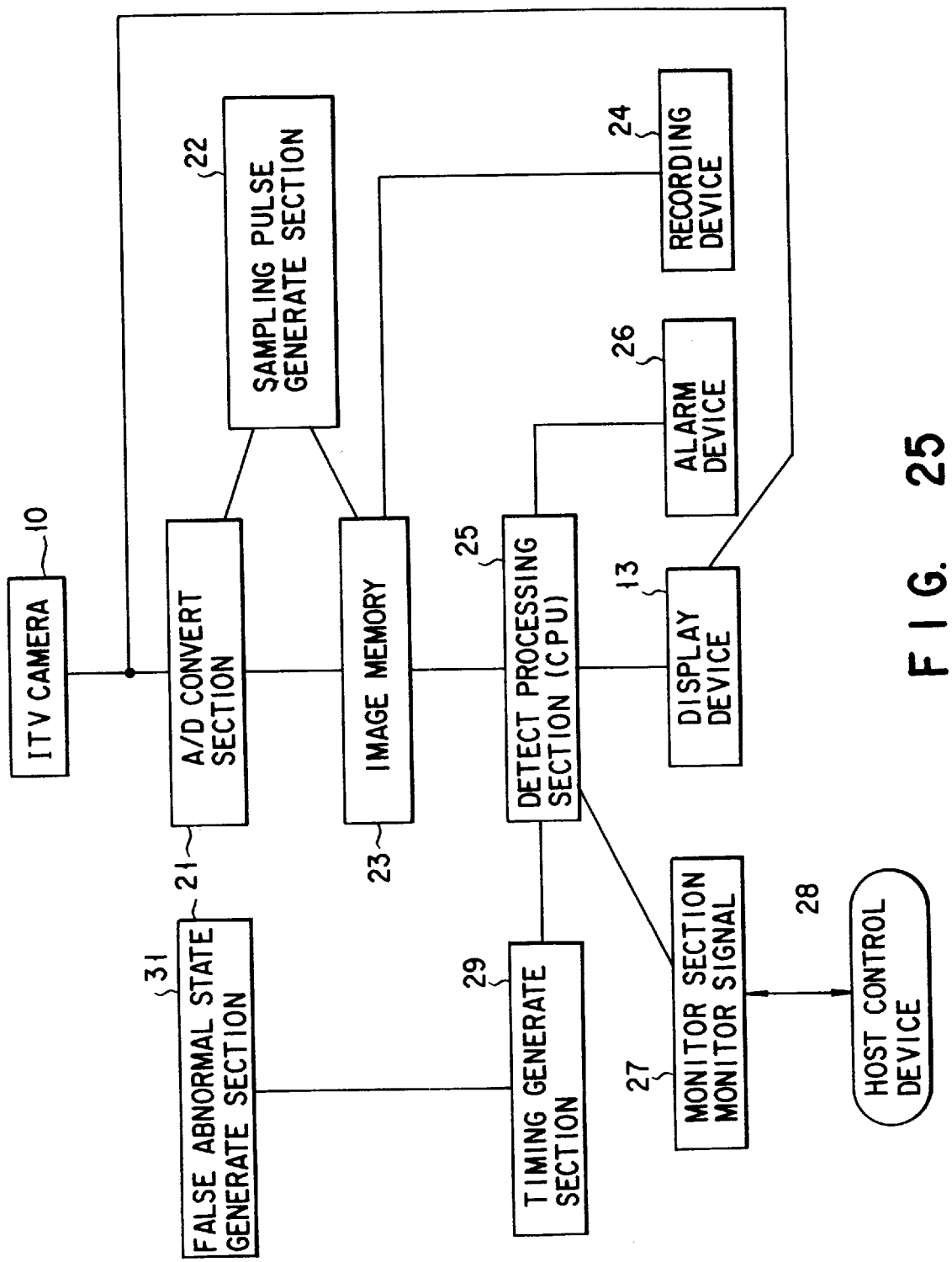
FIG. 25 is a block diagram of an example of a structure mainly showing a processing device according to a fourth embodiment of the present invention.

FIG. 25 is a block diagram of an example of a structure mainly showing a processing device 12 according to a fourth embodiment of the present invention. This embodiment explains a case comprising a self-diagnosis function for a detect function of the image pick-up system, and differs from the third embodiment in that a false abnormal state generate section 31 is provided in place of a mark generate section 30 in the third embodiment of FIG. 21.

Figure 26:
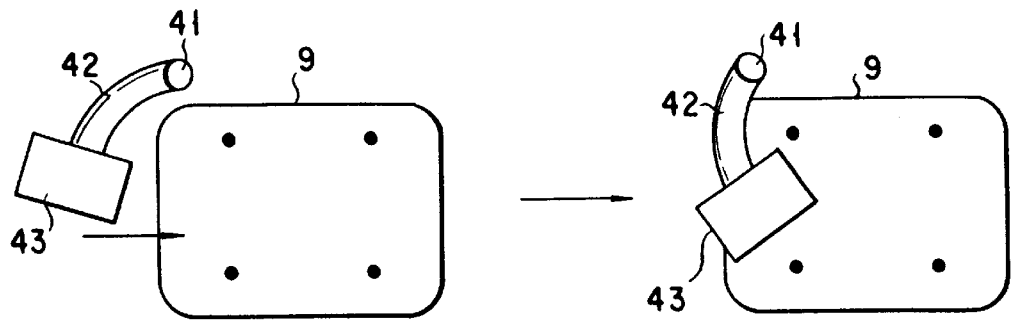
FIG. 26 explains a specific example of a false abnormal state generating section.

Specifically, the false abnormal state generate section 31 generates a false abnormal state within a monitor area 9 when self-diagnosis for the detect function is performed. As a specific generate method of generating a false abnormal state in the false abnormal state generate section 31, for example, there is a method in which a false object 43, similar to a paper material P to be actually conveyed, is installed at an end portion of an arm 42 rotated around a shaft 41 as a fulcrum, as shown in FIG. 26, and the arm 42 is rotated so as to insert the false object 43 into the monitor area 9 when a generation instruction is supplied, thus generating a false abnormal state.

In the above example, explanation has been made to a method in which a false object 43 is installed on an end portion of the arm 42. However, it is possible to use another method instead of the method described above, as long as such a method can generate a false abnormal state.

Figure 27:
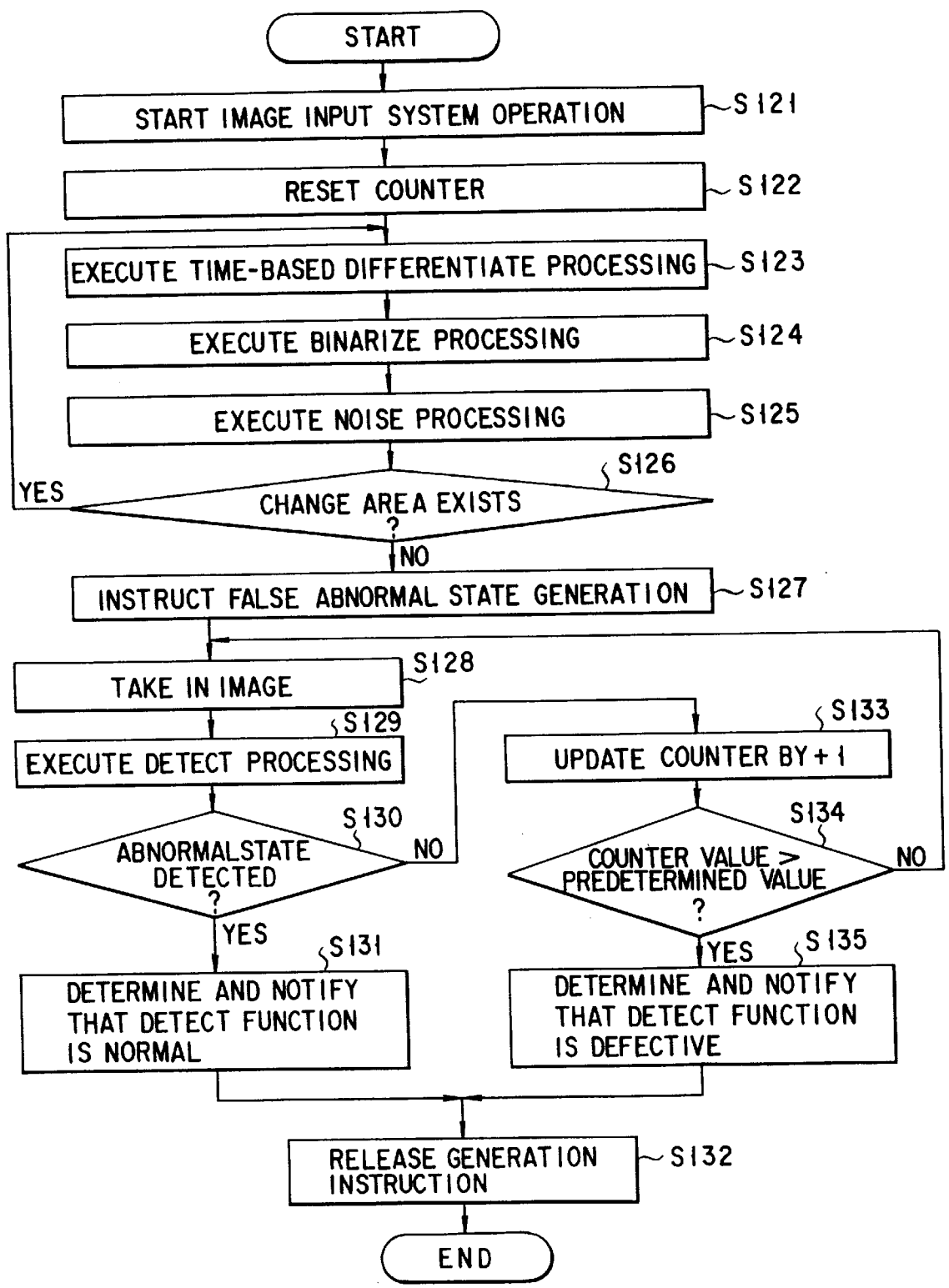
FIG. 27 is a flow-chart which explains self-diagnosis processing of a detect function.

Next, the processing for performing self-diagnosis to determine whether the detect function is operating normally (i.e., whether an abnormal state occurring in a monitor area 9 can be correctly detected in this case) will be explained, with reference to flow-charts shown in FIG. 27. Image input operation from the ITV camera 10 is started (S121), and the self-diagnosis time measurement counter is reset (S122).

Then, the detect processing section 25 performs time-based differentiate processing on consecutive images on the time-base, which are taken in by the image memory 23. A difference between two consecutive images in the image memory 23 is obtained (S123), and noise processing (S125) is performed on a result obtained by performing binarize processing (S124) on the result obtained above as the difference. Finally, whether concentrated change areas exist in an image is checked (S126). If such change areas exist, there is a possibility that the apparatus is moving within a monitor area 9, and therefore, the flow returns to the differentiate processing in the step S103. The operation as described above is repeated.

With respect to noise reduction, it is possible to achieve noise reduction, for example, by eliminating isolated points from a binary image by means of compression and expansion processing.

If an abnormal state exists in the monitor area 9 (S126), the flow returns to image take-in processing in step S123, and the same processing as above is repeated.

If an abnormal state is not detected in the step 126, the detect processing section sends a false abnormal state generate instruction to a false abnormal state generate section 31 through a timing generate section 29 (S127), thereby to cause a false abnormal state to be generated in the monitor area 9, as described above.

Then, the detect processing section 25 takes in an image in the monitor area 9 again (S128), and performs detect processing by a method of time-based difference using a plurality of images taken in by the image memory 23, like detection of an abnormal conveyance state as described above, or by a method of image division detect processing as specifically explained above (S129), thereby to check whether or not an abnormal state is detected (S130) after generation of an abnormal state is instructed. If an abnormal state is detected, the detect function is determined as operating normally, and the state that this function is operating normally is displayed on the display device 13 (S131). Then, the abnormal state generate instruction is released (S132).

If an abnormal state is not detected in step S130, the contents of the self diagnosis time measurement counter is updated by "+1" (S133), and thereafter, whether or not the contents of the counter is larger than a predetermined value previously set is determined (S134). If the contents is smaller than the predetermined value, the flow returns to the image take-in processing in the step S128, and the same operation as described above is repeated.

In the step S134, if the contents of the counter is larger than the predetermined value, it is determined that there is a defect in the detect function or that there is a defect in an input from the image pick-up system, and the state that there is a defect is displayed on the display device 13 (S135). Then, the flow goes to the step S132 and releases the abnormal state generate instruction.

Specifically, if an abnormal state cannot be detected when a predetermined time has passed since an instruction of generating an abnormal state was supplied, it is determined that there is a defect in the detect function or that there is a defect in an input from the image pick-up system and a notification is supplied. If an abnormal state is detected within the predetermined time, it is determined that the detect function is operating normally and a notification is supplied. The successive processing is then continued.

Next, a fifth embodiment of the present invention will be explained below. This embodiment explains a case comprising an automatic setting function of a monitor area 9.

Figure 28:
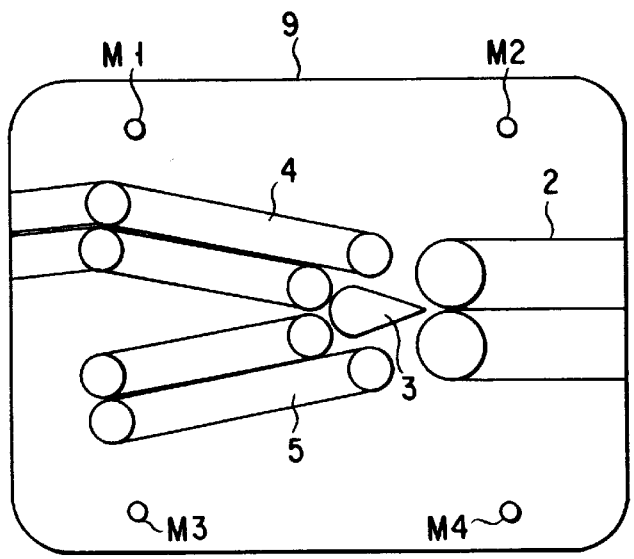
FIG. 28 shows an example of placement of a mark within a set monitor area according to a fifth embodiment of the present invention.

FIG. 28 shows four marks M1, M2, M3, and M4 placed in a monitor area 9 to be monitored according to the third embodiment shown in FIG. 20. This embodiment has an object of securely monitoring the area surrounded by the marks M1, M2, M3, and M4. In the following, the area surrounded by these marks will be referred to as a monitor area 9, and explanation will be made supposing that four marks are set.

Figures 29A, 29B, 29C:
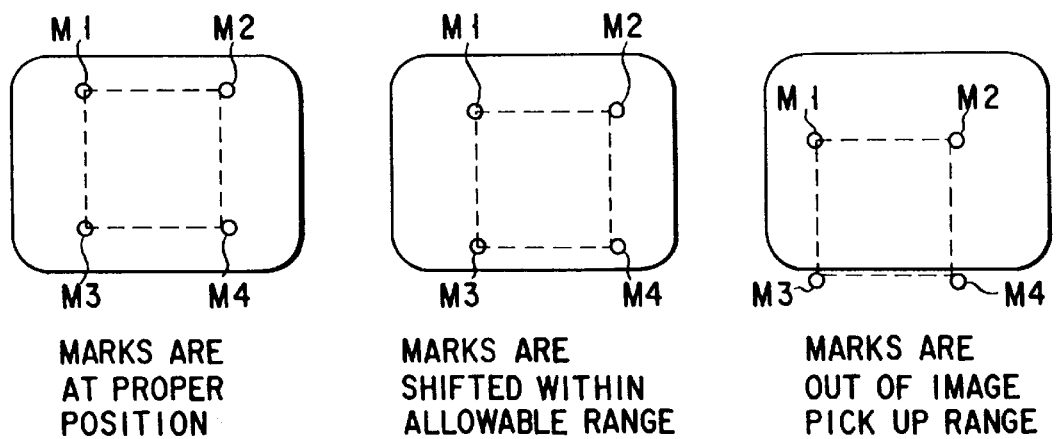
FIG. 29A to FIG. 29C explain how a mark is viewed in a picked up image.

When four marks M1, M2, M3, and M4 placed in the monitor area 9 are picked up and taken in as an image by an ITV camera 10, these marks are viewed in several different ways due to locations of the ITV camera 10 or the likes. For example, FIG. 29A shows a normal state in which the monitor area 9 is positioned substantially in the center of the camera view field. FIG. 29B shows a state in which the monitor area 9 is positioned within the camera view field but shifted from the center of the view field. FIG. 29C shows an example in which the monitor area 9 is out of the camera view field, and in this case, it is difficult to carry out monitoring which will achieve the object of this embodiment.

Figure 30B:
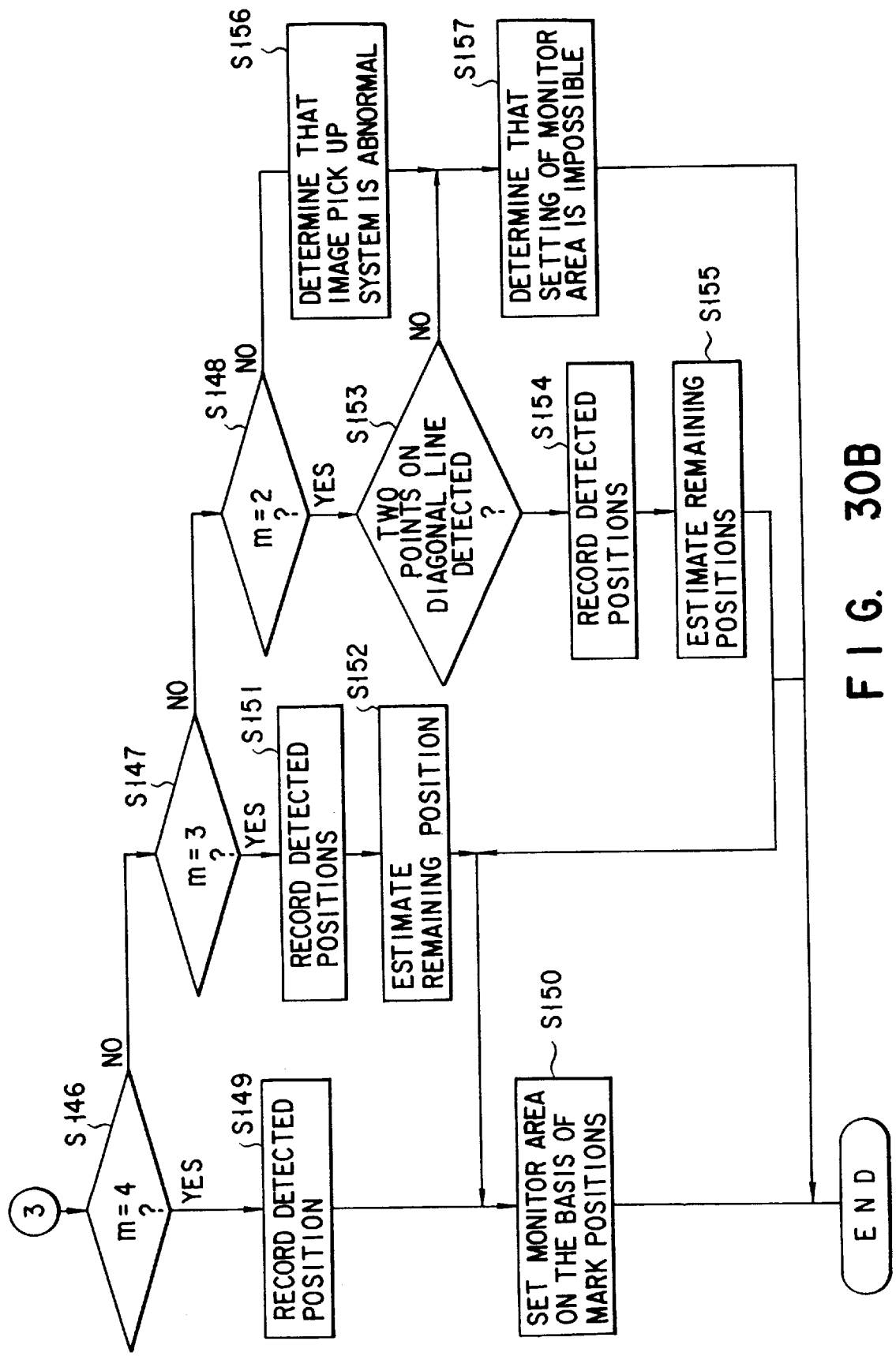
FIG. 30B is a flow-chart explaining an operation for setting a monitor area.

In the following, the setting operation for setting a monitor area 9 will be explained with reference to flow-charts shown in FIGS. 30A and 30B. Image input operation from an ITV camera 10 is started (S141), and image data is taken in by the image memory 23 (S143). In this state, the number (i.e., "4" in this case) of marks used for setting a monitor area 9 is previously registered (S142).

Then, the detect processing section 25 performs processing for detecting marks by a method of time-based difference using a plurality of images taken in by the image memory 23, like detection of an abnormal conveyance state, as described above, or by a method of image division detect processing as specifically explained above (S144), thereby to calculate the number m of marks thus detected (S145). Then, the calculated number m is compared with the number n of marks previously set (S146, S147, and S148). If the number of detected marks is 3 or more, as a result of this comparison, it is possible to set a monitor area on the basis of these marks, and therefore, the area to be monitored is set on the basis of the positions of these marks.

Specifically, if the number of detected marks is 4, the detect positions are recorded (S149), and thereafter, the monitor area 9 is set on the basis of the respective positions of the four marks (S150). If the number of detected marks is 3, detected positions thereof are recorded, and thereafter, the position of a fourth mark is estimated on the basis of the respective positions of the three marks (S152). If the position of the fourth mark is estimated, the processing goes to the step S150 and a monitor area 9 is set.

Otherwise, if the number of detected marks is 2 or less (although at least three or more marks are necessary), it is not possible to set an area except for several specific cases. In this case, it is therefore considered that the image pick-up system cannot pick up the marks, and an instruction for correcting the setting of the image pick-up system is supplied.

Specifically, if the number of detected marks is 2, whether the two marks are corners on the diagonal line of a monitor area is determined (S153). If yes, the detected positions thereof are recorded (S154), and thereafter, positions of the two other remaining marks are estimated on the basis of the respective positions of the two marks (S155). If those positions are estimated, the processing goes to the step S150 and a monitor area 9 is set.

In addition, if the number of detected marks is less than 2, it is determined that the image pick-up system is abnormal (S156), and a notification indicating that the setting of a monitor area is impossible is displayed on the display device 13 (S157). Further, if the number of detected marks is two and the two marks are not two corners on a diagonal line, in step S153, processing goes to step S157, and a message indicating that the setting of a monitor area is impossible is displayed.

Although the above explanation has been made for a case in which a monitor area is set by supposing that the number of marks is four, the number of marks is not especially limited as long as the number of marks is 2 or more. In addition, it is possible to use the mark explained in the third embodiment described above, as an example of marks.

As has been explained above, according to the first embodiment of the present invention, processing with use of information concerning the entire image is not performed, but an image is divided into a plurality of areas, and processing using characteristic amounts in respective areas is performed. Analysis is performed on the time-based changes in the characteristic amounts. Thus, by roughly dividing an image intentionally, it is possible to absorb small changes, such as vibration and the like, and to concentrate on extracting only large changes (such as a movement of an object in an image), so that changes in an image, such as the occurrence of an abnormal state, and the like can be extracted without making a comparison with templates.

In addition, it is possible to absorb the effect caused by vibration of an ITV camera or the like, in the step of dividing an image into a plurality of areas, so that processing such as noise reduction is not required.

According to the second embodiment, it is possible to perform fine detection of an abnormal state and abnormal state detect processing at a high processing speed, by further dividing the divided areas or by fusing the divided areas with each other.

In addition, according to the third and fourth embodiments as described above, it is possible to absorb a large or small shift of the installation position of an ITV camera and to notify a system manager of the portion where a defect occurs on the basis of a diagnosis result, by comprising a self-diagnosis function to confirm that an image pick-up system or a detection function is operating normally. Therefore, labor for inspections and adjustment services can be greatly reduced.

According to the fifth embodiment, the monitor area as a target can be automatically corrected, and therefore, erroneous detection is not easily caused even when the orientation of an ITV camera is more or less changed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image data processing apparatus comprising:
   means for continuously receiving an image of a first area to be processed, and for converting the image into a first image data item;
   means for dividing the first image data item into a plurality of second image data items corresponding to a plurality of second areas, each one of the plurality of second areas being smaller than the first area;
   means for detecting ones of the plurality of second image data items indicating an abnormal state;
   means for combining adjacent ones of the plurality of the second image data items indicating the abnormal state, so as to output a combined second image data item; and
   means for determining that the first area is in an abnormal state when a number of the second image data items in the combined second image data item is greater than a predetermined amount.

2. An apparatus according to claim 1, wherein the detecting means includes means for detecting a time-based change in a characteristic amount for each of the second image data items.

3. An apparatus according to claim 1, wherein the detecting means includes means for detecting a time-based change in an average density amount for each of the second image data items.

4. An apparatus according to claim 1, wherein the detecting means includes means for detecting a time-based change in a density dispersion value for each of the second image data items.

5. An apparatus according to claim 1, wherein the detecting means includes means for detecting a time-based change in randomness obtained as a result of differential binarization for each of the second image data items.

6. An apparatus according to claim 1, wherein the detecting means includes means for detecting a time-based change in a hue amount of a color image for each of the second image data items.

7. An apparatus according to claim 1, wherein the detecting means includes means for detecting a time-based change in chroma of a color image for each of the second image data items.

8. An apparatus according to claim 1, wherein the detecting means includes means for detecting a time-based change in brightness of a color image for each of the second image data items.

9. An apparatus according to claim 1, further comprising:
   means for generating a recognizable mark in the first area at a predetermined timing;
   means for detecting the mark generated by the generating means
   means for judging whether the generated recognizable mark is detected when the generating means generates the recognizable mark; and
   means for performing a self-diagnosis of the apparatus corresponding to a result of the judging means.

10. An apparatus according to claim 1, further comprising:
    means for generating four recognizable marks in the first area at a predetermined timing;
    means for detecting the four marks generated by the generating means
    means for judging whether at least two of the four marks are detected when the generating means generates the four marks; and
    means for performing a self-diagnosis of the apparatus corresponding to a result of the judging means, and determining an abnormality in the first area when the judging means judges that at least two of the four marks are not detected.

11. An image data processing apparatus comprising:
    means for continuously receiving an image of a first area to be processed, and for converting the image into a first image data item;
    first dividing means for dividing the first image data item into a plurality of second image data items corresponding to a plurality of second areas, each of the second area being smaller than the first area;
    first detecting means for detecting a time-based change amount in a characteristic amount for each of the second image data items;
    second dividing means for dividing the second image data items into third image data items corresponding to a plurality of third areas, each of the third areas being smaller than each of the second areas, when the first detecting means detects the time-based change amount being more than a predetermined value for a number of times exceeding a predetermined number and continuing for at least a predetermined period;
    second detecting means for detecting a time-based change amount in a characteristic amount for the third image data items; and
    means for determining that the first area is in abnormal state corresponding to the time-based change amounts detected by the first and the second detecting means.

12. An image data processing apparatus comprising:
    means for continuously receiving an image of a first area to be processed, and for converting the image into a first image data item;
    first dividing means for dividing the first image data item into a plurality of second image data items corresponding to a plurality of second areas, each of the second areas being smaller than the first area;

first detecting means for detecting a time-based change amount in a characteristic amount for each of the second image data items;

means for finding those plain image data items from the second image data items which have the time-based change amount in the characteristic amount which is smaller than a predetermined value for at least a predetermined period and are adjacent to other plain image data items having the same characteristics;

means for combining the plain image data items found by the finding means into a combined image data item;

second detecting means for detecting a time-based change amount in a characteristic amount for the combined image data item; and means for determining that the first area is in an abnormal state based on the time-based change amounts detected by the first and the second detecting means.

13. An image data processing apparatus comprising:

means for continuously receiving an image of a first area to be processed, and for converting the image into a first image data item;

first dividing means for dividing the first image data item into a plurality of second image data items corresponding to a plurality of second areas, each of the second areas being smaller than the first area;

first detecting means for detecting a time-based change amount in a characteristic amount for each of the second image data items;

second dividing means for dividing the second image data items into third image data items corresponding to a plurality of third areas, each of the third areas being smaller than the second area, when the first detecting means detects the time-based change amount is more than a predetermined value for a number of times exceeding a predetermined number and continues for at least a predetermined period;

means for finding those plain image data items from the second image data items which have the time-based change amount in the characteristic which is smaller than a second predetermined value for at least a second predetermined period and are adjacent to other plain image data items having the same characteristics;

means for combining the plain image data items found by the finding means into a combined image data item;

second detecting means for detecting a time-based change amount in a characteristic amount for the third image data items and the combined image data item; and means for determining that the first area is in an abnormal state corresponding to the time-based change amounts detected by the first and the second detecting means.

14. An apparatus according to claim 13, further comprising:

means for generating a recognizable mark in the first area at a predetermined timing;

means for detecting the mark generated by the generating means;

means for judging whether the generated recognizable mark is detected when the generating means generates the recognizable mark; and means for performing a self-diagnosis of the apparatus corresponding to a result of the judging means.

15. An apparatus according to claim 13, further comprising:

means for generating four recognizable marks in the first area at a predetermined timing;

means for detecting the four marks generated by the generating means;

means for judging whether at least two of the four marks are detected when the generating means generates the four marks; and means for performing a self-diagnosis of the apparatus corresponding to a result of the judging means, and determining an abnormality in the first area when the judging means judges that at least two of the four marks are not detected.

16. An image data processing method, comprising:

continuously receiving an image of a first area to be processed and converting the image into a first image data item;

dividing the first image data item into a plurality of second image data items corresponding to a plurality of second areas, each one of the plurality of second areas being smaller than the first area;

detecting ones of the plurality of second image data items indicating an abnormal state;

combining adjacent ones of the plurality of the second image data items indicating the abnormal state, so as to form a combined second image item; and determining that the first area is in an abnormal state when a number of the second image data items in the combined second image data item is greater than a predetermined amount.

17. An image data processing method according to claim 16, further comprising:

generating a recognizable mark in the first area at a predetermined timing;

detecting the mark generated by the generating means;

judging whether the generated recognizable mark is detected when the recognizable mark is generated by the generating step; and performing a self-diagnosis corresponding to a result of the judging step.

18. An image data processing method, according to claim 16, further comprising:

generating four recognizable marks in the first area at a predetermined timing;

detecting the four marks generated by the generating step;

judging whether at least two of the four marks are detected when the four marks are generated by the generating step; and performing a self-diagnosis corresponding to a result of the judging step; and determining an abnormality in the first area when at least two of the four marks are not detected by the detecting step.

19. An image data processing method, comprising:

continuously receiving an image of a first area to be processed, and converting the image into a first image data item;

dividing the first image data item into a plurality of second image data items corresponding to a plurality of second areas, each of the second areas being smaller than the first area;

detecting a time-based change amount in a characteristic amount for each of the second image data items;

dividing the second image data items into third image data items corresponding to a plurality of third areas, each of the third areas being smaller than each of the second areas, when the step of detecting the time-based change amount in the characteristic amount for the each of the second image data items detects that the time-based change amount is more than a predetermined value for a number of times exceeding a predetermined number and continuing for at least a predetermined period;

detecting a time-based change amount in a characteristic amount for the third image data items; and determining that the first area is in an abnormal state corresponding to the time-based change amount detected by the step of detecting the time-based change amount in the characteristic amount for the each of the second image data items and the step of detecting the time-based change amount in the characteristic amount for the third image data items.

20. An image data processing method, comprising:

continuously receiving an image of a first area to be processed, and converting the image into a first image data item;

dividing the first image data item into a plurality of second image data items corresponding to a plurality of second areas, each of the second areas being smaller than the first area;

detecting a time-based change amount in a characteristic amount for each of the second image data items;

finding those plain image data items from the second image data items, which have the time-based change amount in the characteristic amount being smaller than a predetermined value for at least a predetermined period and are adjacent to other plain image data items having the same characteristics;

combining the plain image data items found by the step of finding plain image data items into a combined image data item;

detecting a time-based change amount in a characteristic amount for the combined image data item; and determining that the first area is in an abnormal state based on the time-based change amounts detected by the step of detecting the time-based change amount in the characteristic amount for the each of the second image data items and the step of detecting the time-based change amount in the characteristic amount for the combined image data item.

21. An image data processing method, comprising:

continuously receiving an image of a first area to be processed, and converting the image into a first image data item;

dividing the first image data item into a plurality of second image data items corresponding to a plurality of second areas, each of the second areas being smaller than the first area;

detecting a time-based change amount in a characteristic amount for each of the second image data items;

dividing the second image data items into third image data items corresponding to a plurality of third areas, each of the third areas being smaller than the second area, when the step of detecting the time-based change amount in the characteristic amount for each of the second image data items detects the time-based change amount being more than a predetermined value for a number of times exceeding a predetermined number for at least a predetermined period;

finding those plain image data items from the second image data items, which have the time-based change amount in the characteristic amount being smaller than a second predetermined value for at least a second predetermined period and are adjacent to other plain image data items having the same characteristics;

combining the plain image data items found during the step of finding plain image data items into a combined image data item;

detecting a time-based change amount in a characteristic amount for the third image data items and the combined image data item; and determining that the first area is in an abnormal state corresponding to the time-based change amount detected in the step of detecting the time-based change amount in the characteristic amount for the each of the second image data items and the step of detecting the time-based change amount in the characteristic amount for the third image data items and the combined image data item.

22. An image data processing method according to claim 21, further comprising:

generating a recognizable mark in the first area at a predetermined timing;

detecting the mark generated by the generating means;

judging whether the generated recognizable mark is detected when the recognizable mark is generated by the generating step; and performing a self-diagnosis corresponding to a result of the judging step.

23. An image data processing method, according to claim 21, further comprising:

generating four recognizable marks in the first area at a predetermined timing;

detecting the four marks generated by the generating step;

judging whether at least two of the four marks are detected when the four marks are generated by the generating step; and performing a self-diagnosis corresponding to a result of the judging step; and determining an abnormality in the first area when at least two of the four marks are not detected by the detecting step.

* * * * *